(12) United States Patent
Stollnitz et al.

(10) Patent No.: US 6,989,830 B2
(45) Date of Patent: Jan. 24, 2006

(54) ACCURATE BOOLEAN OPERATIONS FOR SUBDIVISION SURFACES AND RELAXED FITTING

(75) Inventors: Eric Joel Stollnitz, Seattle, WA (US); Peter Leipa, Ontario (CA)

(73) Assignee: Alias Systems Corp., Toronto (CA)

( * ) Notice: Subject to any disclaimer, the term of this patent is extended or adjusted under 35 U.S.C. 154(b) by 570 days.

(21) Appl. No.: 10/185,748

(22) Filed: Jul. 1, 2002

(65) Prior Publication Data
US 2004/0001060 A1    Jan. 1, 2004

(51) Int. Cl.
*G06T 17/00*    (2006.01)
(52) U.S. Cl. ..................................... 345/420
(58) Field of Classification Search ................ 345/419, 345/420, 423, 427, 428
See application file for complete search history.

(56) References Cited

U.S. PATENT DOCUMENTS 6,307,555 B1    10/2001    Lee

OTHER PUBLICATIONS

Levy, "Constrained Texture Mapping for Polygonal Meshes", Aug., 2001, ACM, pp. 417-424.*
Jos Stam. "Exact Evaluation of Catmull-Clark Subdivision Surfaces At Arbitrary Parameter Values." Alias/Wavefront, Inc.
E. Catmull, et al. "Recursively Generated B-Spline Surfaces on Arbitrary Topological Meshes." 1978. pp. 350-355.
Mark Halstead, et al. "Efficient, Fair Interpolating Using Catmull-Clark Surfaces." Apple Comptuer, Inc.
Nathan Litke, et al. "Fitting Subdivision Surfaces." Tel Aviv University.
Henning Biermann, et al. "Approximate Boolean Operations on Free-form Solids." NYU Media Research Laboratory, New York University.
"Catmull-Clark Subdivision Surfaces." http://symbolcraft.com/graphics/subdivision/index.html.

* cited by examiner

*Primary Examiner*—Almis R. Jankus
(74) *Attorney, Agent, or Firm*—Staas & Halsey LLP

(57) ABSTRACT

An apparatus, method, and computer readable storage medium for accurately performing Boolean operations on subdivision surfaces. The present invention produces a base mesh which subdivides into a surface which represents the Boolean operation of two subdivision surfaces. The method includes (a) chopping pieces of two Catmull-Clark bases meshes which correspond to pieces of a Boolean surface computed from limit surfaces of the two base meshes; (b) creating new edges on the chopped pieces to create quadrilaterals and triangles; and (c) merging the chopped pieces with the new edges into a Boolean base mesh which approximates the Boolean surface.

10 Claims, 35 Drawing Sheets

---

Given a set of level n vertices:

Traverse the new level n+1 vertices and for each vertex:

2800 — Identify influencing level N vertices according to catmull clark rules

2802 — Determine and apply a flattening transformation for the influencing vertices and the faces on which they lie in a way that reflects the surface distances between said vertices 2804 — Calculate weighted averages of the flattened vertices according to Catmull Clark rules to determine the flattened level n+1 vertex 2806 — Using the inverse of the flattening transformation, remap the flattened level n+1 vertex to the surface of the mesh (a) original subdivision curves: •—•
original base meshes: ○--○

(b) intersection points of original subdivision curves:

(c1) chopped original base meshes (c2) new base mesh after joining chopped edges (d) comparison of new subdivision curve to original subdivision curves (e) new subdivision curve after fitting to original subdivision curves

Union operation

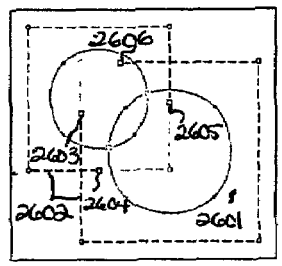
(c) chopped original base meshes
2200
FIG 22A

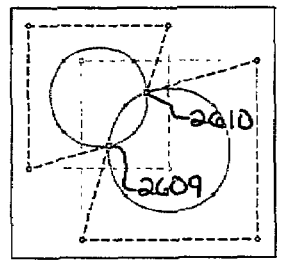
(d) new base mesh after merging chopped edges at intersection points
2208

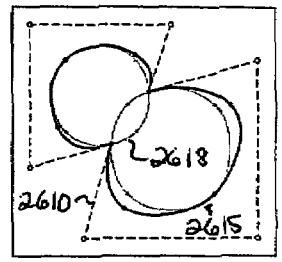
(e) comparison of new subdivision curve to original subdivision curves
2214

Difference operation

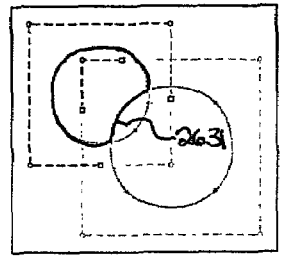
(c) chopped original base meshes
2230
FIG. 22B

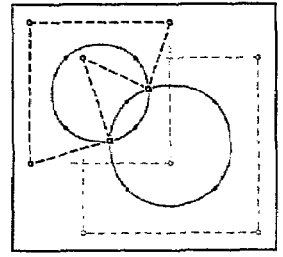
(d) new base mesh after merging chopped edges at intersection points
2232

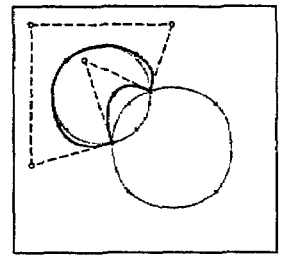
(e) comparison of new subdivision curve to original subdivision curves
2234

Intersection operation

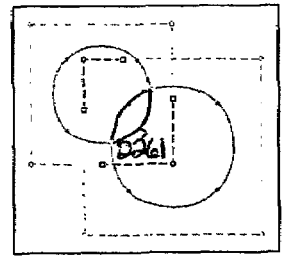
(c) chopped original base meshes
2260
FIG. 22C

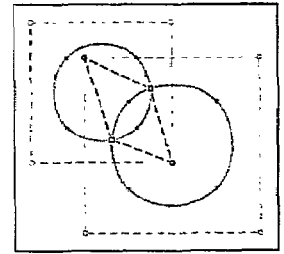
(d) new base mesh after merging chopped edges at intersection points
2262

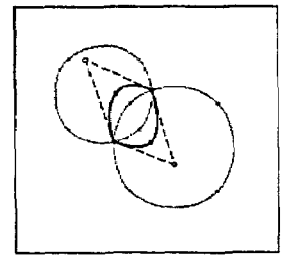
(e) comparison of new subdivision curve to original subdivision curves
2264

FIGURE 22

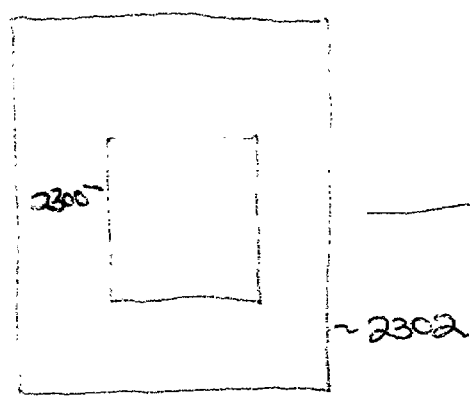
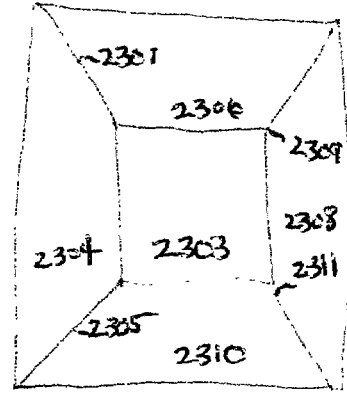
23A          23B
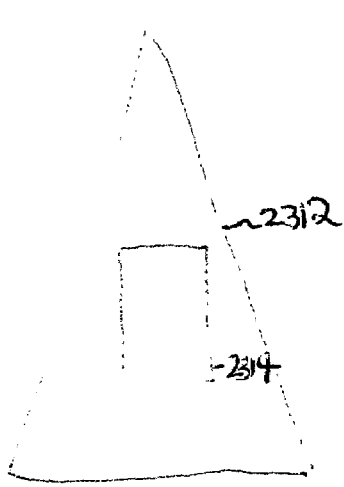
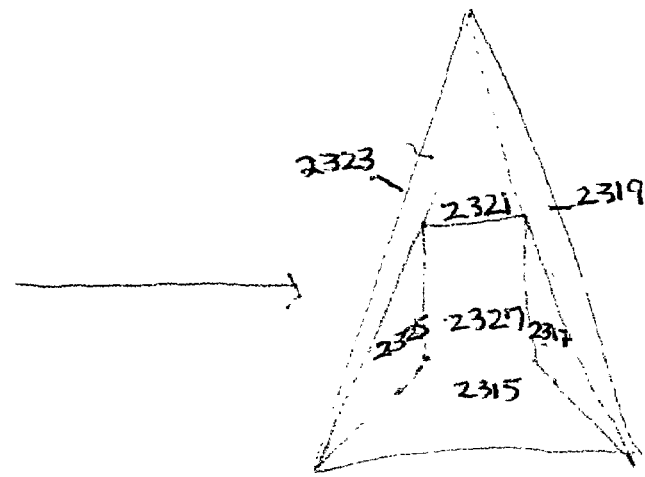
23C          23D

FIGURE 24
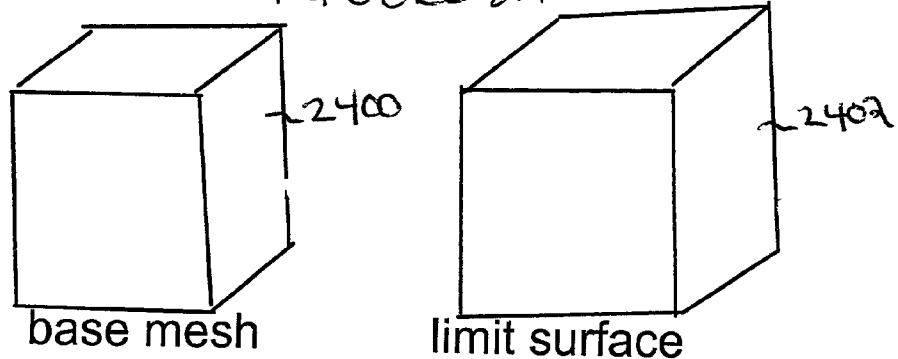
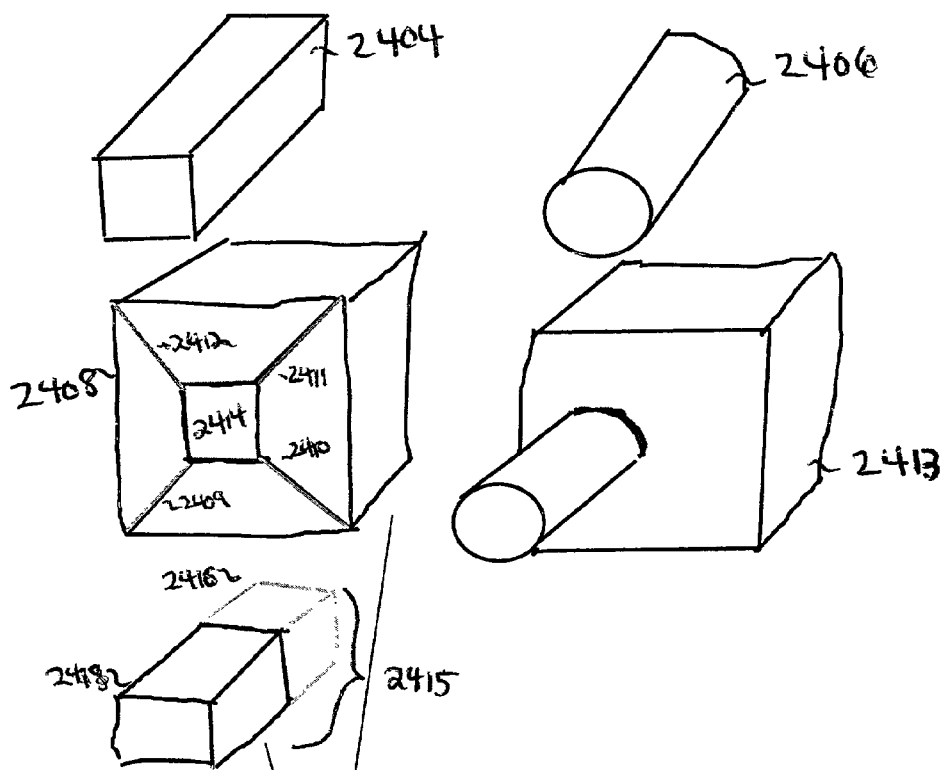
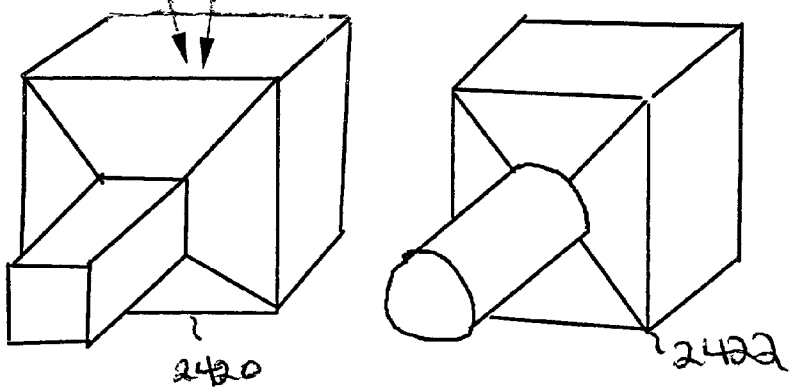

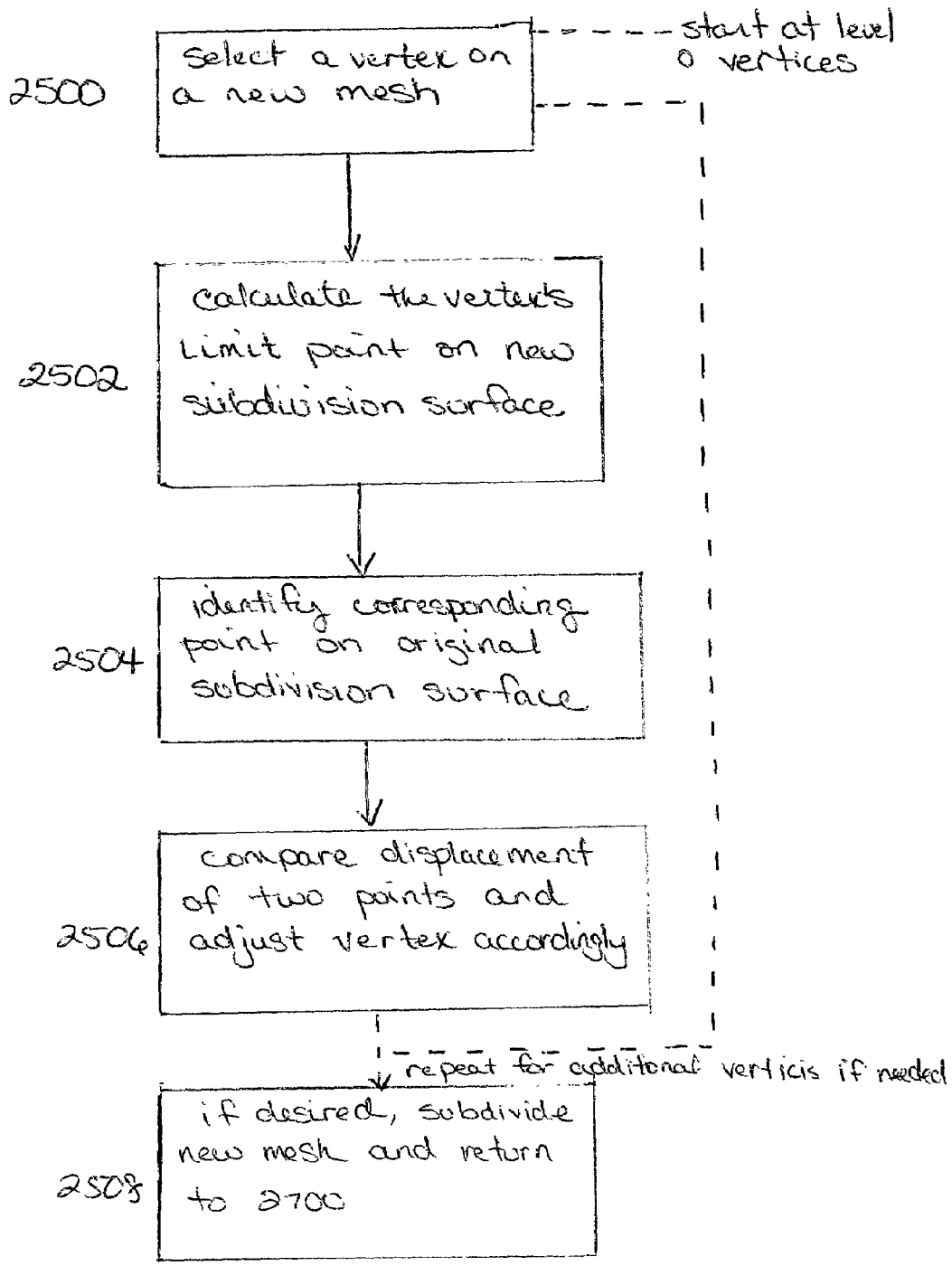

Union operation, continued

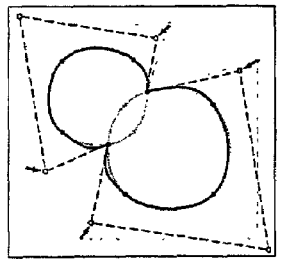 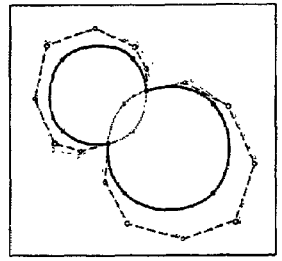 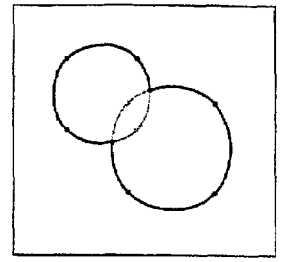

(f) improved match obtained by fitting base mesh (level zero) control vertices
2700

(g) further improved match obtained by fitting level one control vertices
2702

(h) new subdivision curve after fitting to original subdivision curves
2704

FIG. 27A

Difference operation, continued

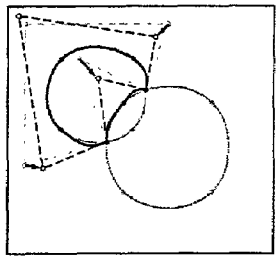 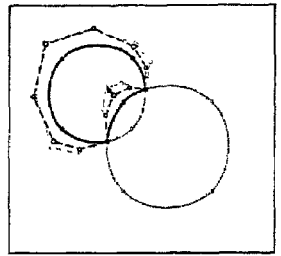 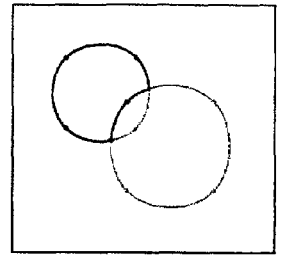

(f) improved match obtained by fitting base mesh (level zero) control vertices
2710

(g) further improved match obtained by fitting level one control vertices
2712

(h) new subdivision curve after fitting to original subdivision curves
2714

FIG. 27B

Intersection operation, continued

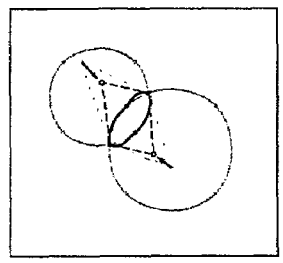 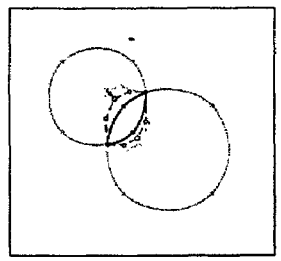 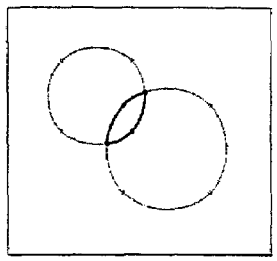

(f) improved match obtained by fitting base mesh (level zero) control vertices
2720

(g) further improved match obtained by fitting level one control vertices
2722

(h) new subdivision curve after fitting to original subdivision curves
2724

FIG. 27C

Given a set of level n vertices:

Traverse the new level n+1 vertices and for each vertex:

2800 — Identify influencing level N vertices according to catmull clark rules

2802 — Determine and apply a flattening transformation for the influencing vertices and the faces on which they lie in a way that reflects the surface distances between said vertices 2804 — Calculate weighted averages of the flattened vertices according to Catmull Clark rules to determine the flattened level n+1 vertex 2806 — Using the inverse of the flattening transformation, remap the flattened level n+1 vertex to the surface of the mesh

FIGURE 28

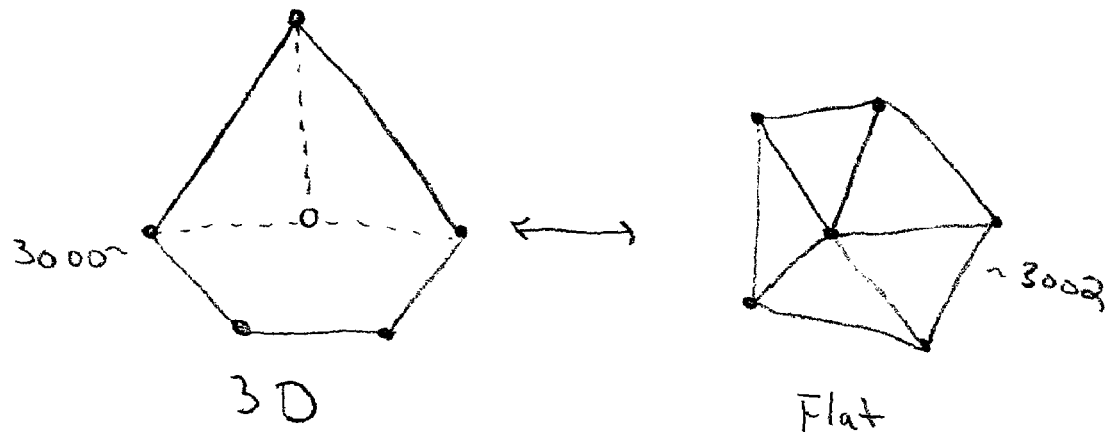
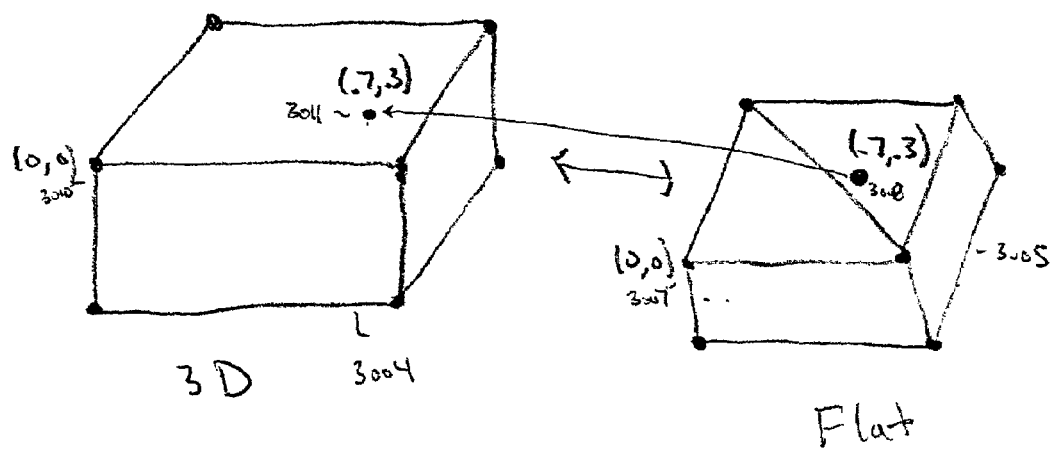
FIGURE 30

ACCURATE BOOLEAN OPERATIONS FOR SUBDIVISION SURFACES AND RELAXED FITTING

BACKGROUND OF THE INVENTION

CROSS-REFERENCE TO RELATED APPLICATION(S)

This application is related to U.S. Pat. No. 6,307,555 B1, entitled Boolean Operations for Subdivision Surfaces, by Eugene T. Y. Lee, issued Oct. 23, 2001, and incorporated by reference herein.

BACKGROUND OF THE INVENTION

1. Field of the Invention

The present invention is directed to a method, apparatus, and computer readable storage for producing a subdivision surface that accurately approximates a Boolean combination of two input subdivision surfaces.

2. Description of the Related Art

Subdivision surfaces are a known modeling tool in computer graphics. They are ideal for modeling because they can be smoothly curved (like spline surfaces) and they can have any topology (like polygon meshes).

A subdivision surface starts with a polygonal base mesh. This base mesh is then repeatedly sub-divided and modified according to selected subdivision rules until a desired, smooth surface is created. For example, a square base mesh typically (although it varies depending on the subdivision scheme chosen) results in a circle. Thus, subdivision surfaces allow an artist or an engineer to work with polygons (either 2D or 3D) which are easy to work with (typically easier than curved surfaces) and then once a model is created the model can be smoothed into a smooth curved surface using subdivision surfaces. Catmull-Clark subdivision surfaces are a popular scheme of subdivision surfaces. See E. Catmull, J. Clark, "Recursively Generated B-Spline Surfaces on Arbitrary Topological Meshes," in Computer Aided Design Oct. 6 1978, for the original paper describing the Catmull-Clark subdivision rules, and which is incorporated by reference herein. Further, many other papers have been written describing subdivision rules and particularly Catmull-Clark subdivision rules.

Boolean operations (union, difference, intersection) are commonly used tools for modeling. For example, a Boolean operation such as intersection would take two intersecting objects, and produce a new object which is the mathematical intersection of the two objects.

The prior art affords no easy way to perform Boolean operations on Catmull-Clark subdivision surfaces.

Therefore, what is needed is an accurate and easy way that Boolean operations on subdivision surfaces can be performed.

SUMMARY OF THE INVENTION

It is an aspect of the present invention to provide an improved way to perform Boolean operations on two or more subdivision surfaces, including Catmull-Clark subdivision surfaces.

The above aspects can be attained by a system that performs: (a) chopping pieces of two Catmull-Clark bases meshes which correspond to pieces of a Boolean surface computed from limit surfaces of the two base meshes; (b) creating new edges on the chopped pieces to create quadrilaterals and triangles; and (c) merging the chopped pieces with the new edges into a Boolean base mesh which approximates the Boolean surface.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 22A illustrates the chopping, merging, and comparison operations for the same inputs illustrated in FIG. 16 for a Boolean Union operation, according to an embodiment of the present invention;

FIG. 22B illustrates the chopping, merging, and comparison operations for the same inputs illustrates in FIG. 16 for a Boolean Difference operation, according to an embodiment of the present invention;

FIG. 22C illustrates the chopping, merging and comparison operations for the same inputs illustrated in FIG. 16 for an Intersection operation, according to an embodiment of the present invention;

FIGS. 23A, 23B, 23C, and 23D illustrate adding edges to a base mesh, according to an embodiment of the present invention;

FIG. 24 illustrates chopping base meshes, adding edges, and combining base meshes, according to an embodiment of the present invention;

FIG. 25 illustrates a flowchart describing a method used to implement the refitting operation of the invention, according to an embodiment of the present invention;

FIG. 27A illustrates the refitting operations continuing the examples illustrated in FIG. 22A according to an embodiment of the present invention.

FIG. 27B illustrates the refitting operations continuing the examples illustrated in FIG. 22B for a Boolean Difference operation, according to an embodiment of the present invention;

FIG. 27C illustrates the refitting operations continuing the examples illustrated in FIG. 22C for an Intersection operation, according to an embodiment of the present invention;

FIG. 28 illustrates a flowchart describing a method used for relaxed fitting, according to an embodiment of the present invention;

FIG. 30 illustrates flattening of three-dimensional vertices, according to an embodiment of the present invention;

DETAILED DESCRIPTION OF THE PREFERRED EMBODIMENTS

One method of performing Boolean operations on a subdivision surface to simply perform the Boolean operations directly on the base mesh itself. Then, the result from the Boolean operation is used as a base mesh to produce a subdivision surface. However, this method is inaccurate. In some cases this method may work appropriately, but in other cases this method produces a surface that "folds over" itself and produces undesirable results. The base meshes can be subdivided before performing the Boolean operation, which may produce a more accurate result. However, this would result in a final surface with an undesirably large amount of vertices. These methods are described in U.S. Pat. No. 6,307,555 B1.

The present invention provides a method, apparatus, and computer readable storage for performing Boolean operations on subdivision surfaces, and creating a base mesh which subdivides into the result of the Boolean operations. Unlike, the previous method described above, the present method, in general, computes the actual surface from the subdivision base mesh, performs the Boolean operations on the subdivision surfaces, and then creates a Boolean base mesh for a resultant surface of the Boolean operations. This produces an accurate Boolean operation and typically the number of vertices on the Boolean base mesh is small.

Figure 1:
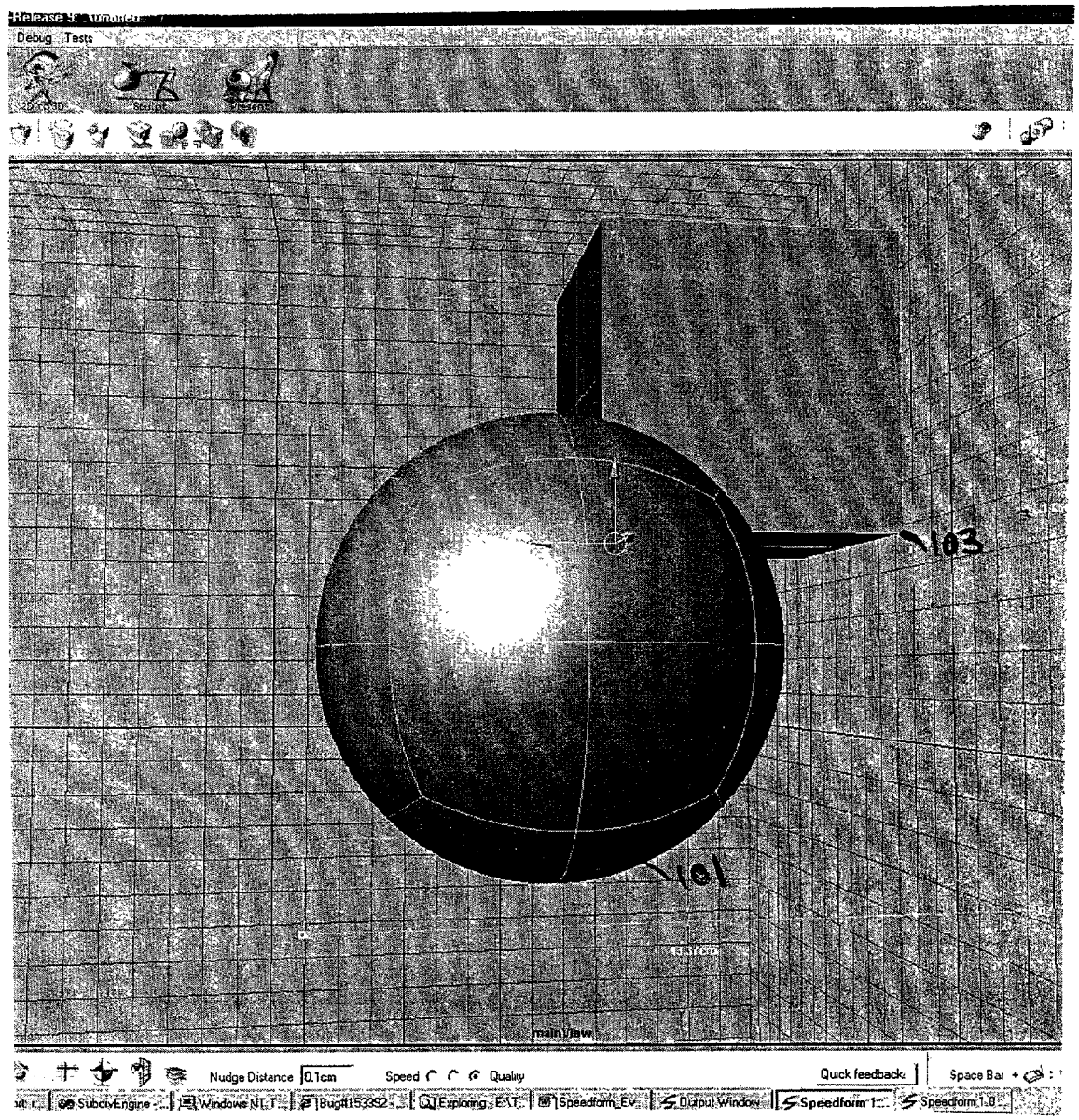
FIG. 1 illustrates a sphere and a cube as inputs, according to an embodiment of the present invention.

FIG. 1 illustrates a sphere and a cube as inputs, according to an embodiment of the present invention.

Sphere 101 is a sphere generated from a cubical base mesh. Cube 103 is a polygon cube. Note there are two separate base meshes, one for each shape (not pictured). The cube 103 is a subdivided surface where certain base mesh edges have been tagged as creased so the surface won't shrink away from those edges as subdivision occurs.

Figure 2:
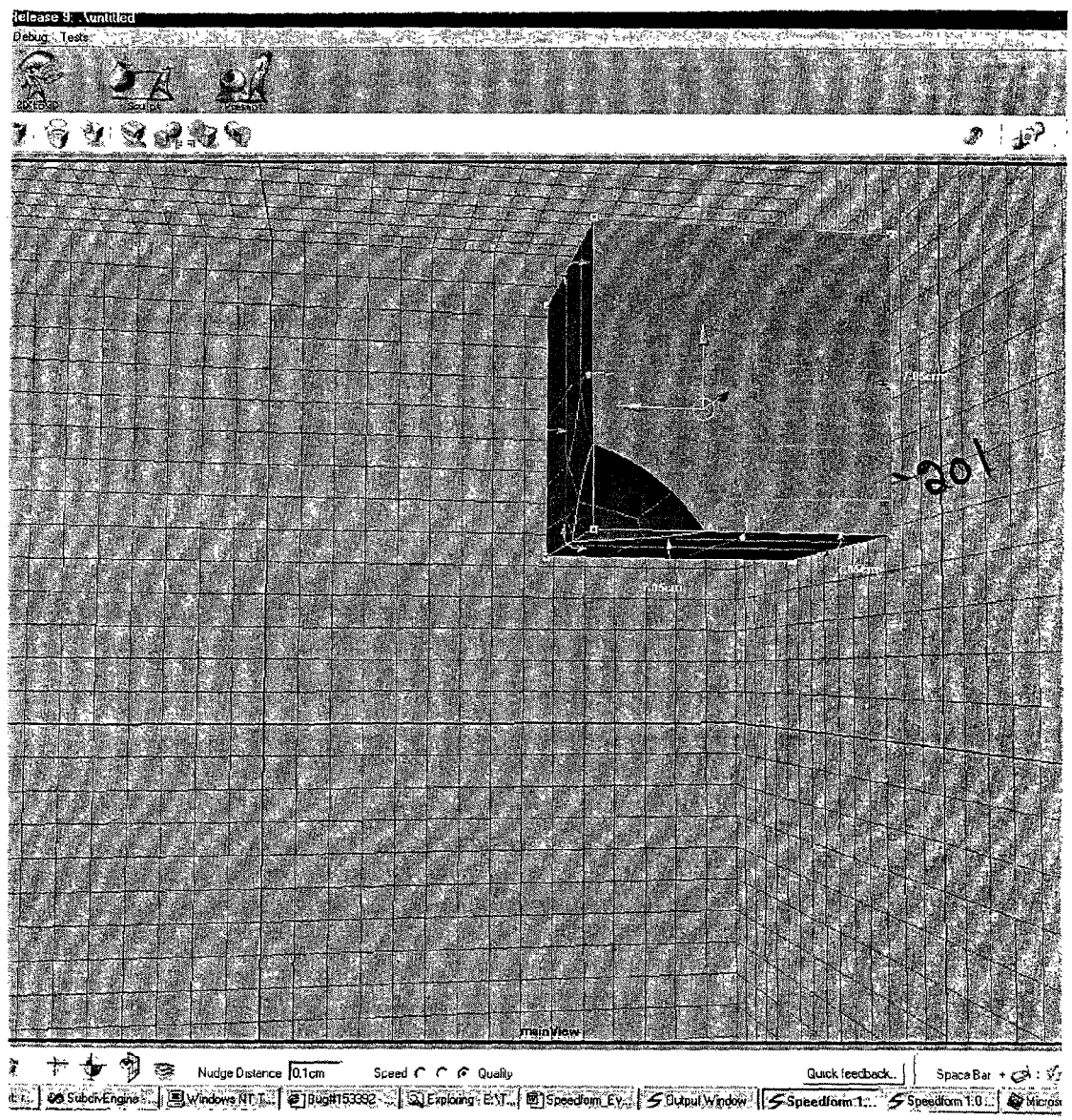
FIG. 2 illustrates a difference operation of the inputs shown in FIG. 1, according to an embodiment of the present invention.

FIG. 2 illustrates a difference operation of the inputs shown in FIG. 1, according to an embodiment of the present invention.

Difference cube 201 results from the subtraction of sphere 101 (from FIG. 1) from cube 103 (from FIG. 1). Note what is actually subtracted is the intersection of the sphere 101 and the cube 103.

Figure 3:
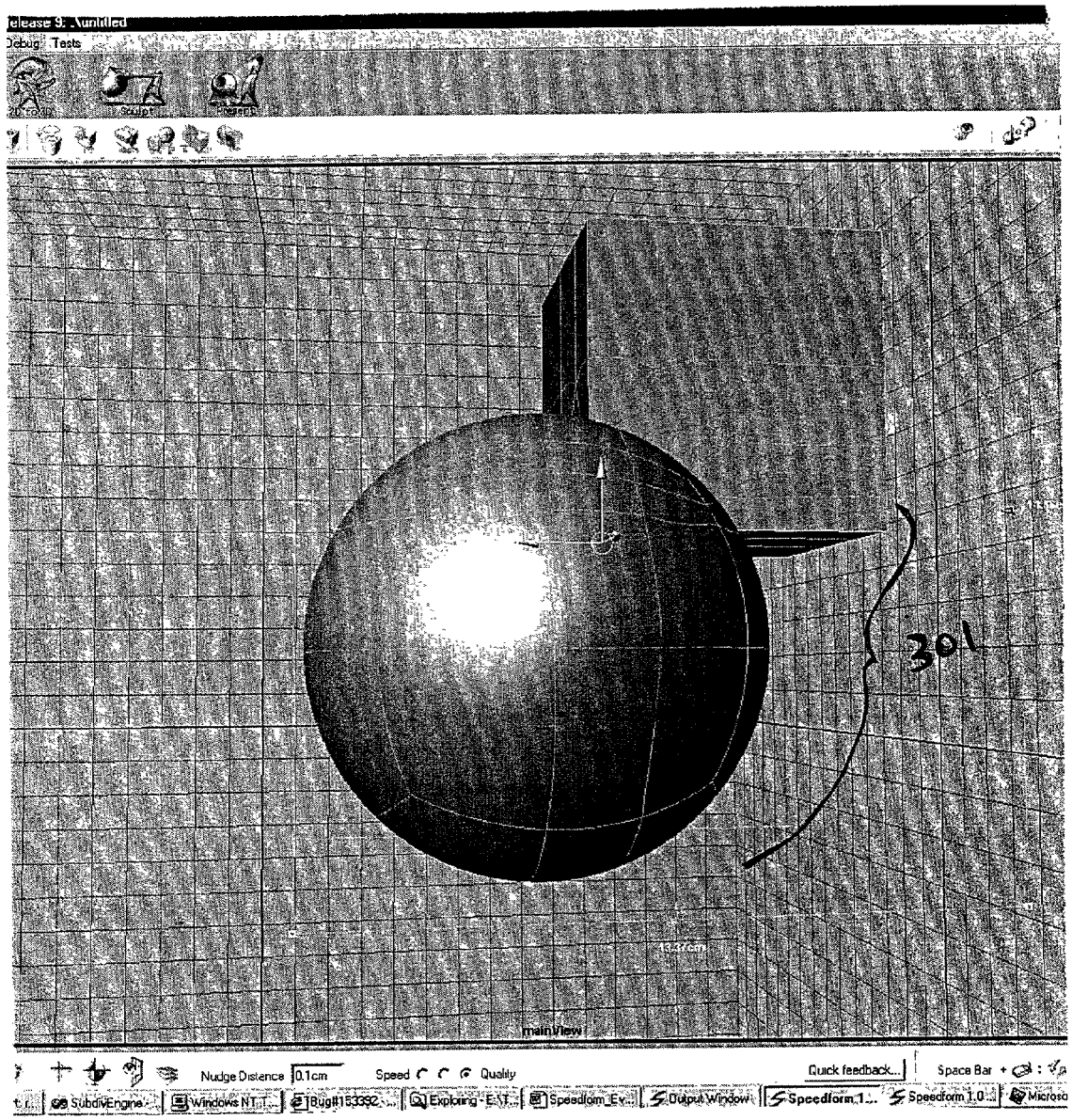
FIG. 3 illustrates a union operation of the inputs shown in FIG. 1, according to an embodiment of the present invention.

FIG. 3 illustrates a union operation of the inputs shown in FIG. 1, according to an embodiment of the present invention.

Combined inputs 301 results from the union of sphere 101 (from FIG. 1) and cube 103 (from FIG. 1). Note that the combined inputs 301 is produced from one base mesh (not pictured).

Figure 4:
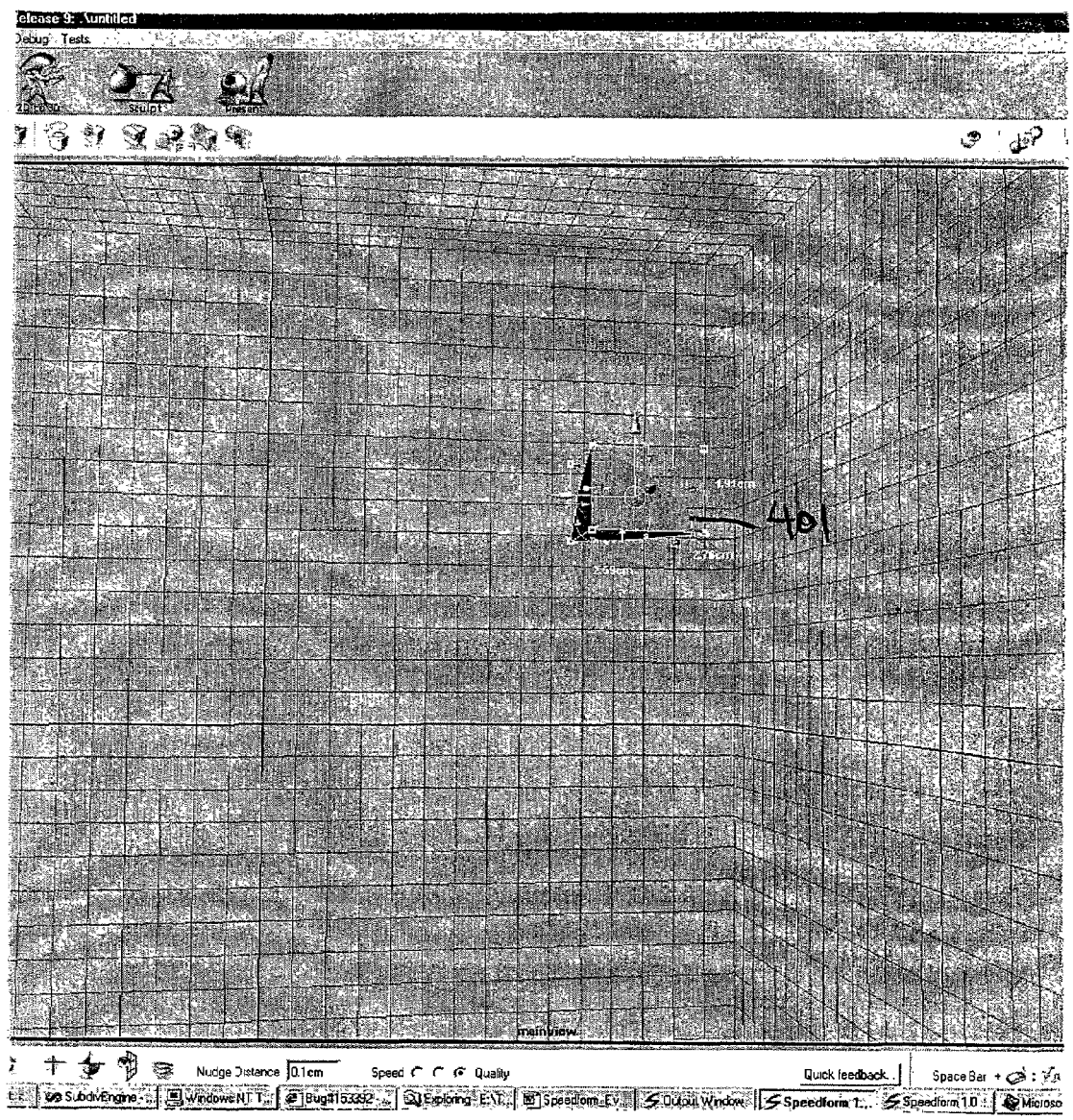
FIG. 4 illustrates an intersection operation of the inputs shown in FIG. 1, according to an embodiment of the present invention.

FIG. 4 illustrates an intersection operation of the inputs shown in FIG. 1, according to an embodiment of the present invention.

Intersected piece 401 results from the intersection of sphere 101 (from FIG. 1) and cube 103 (from FIG. 1).

Figure 5:
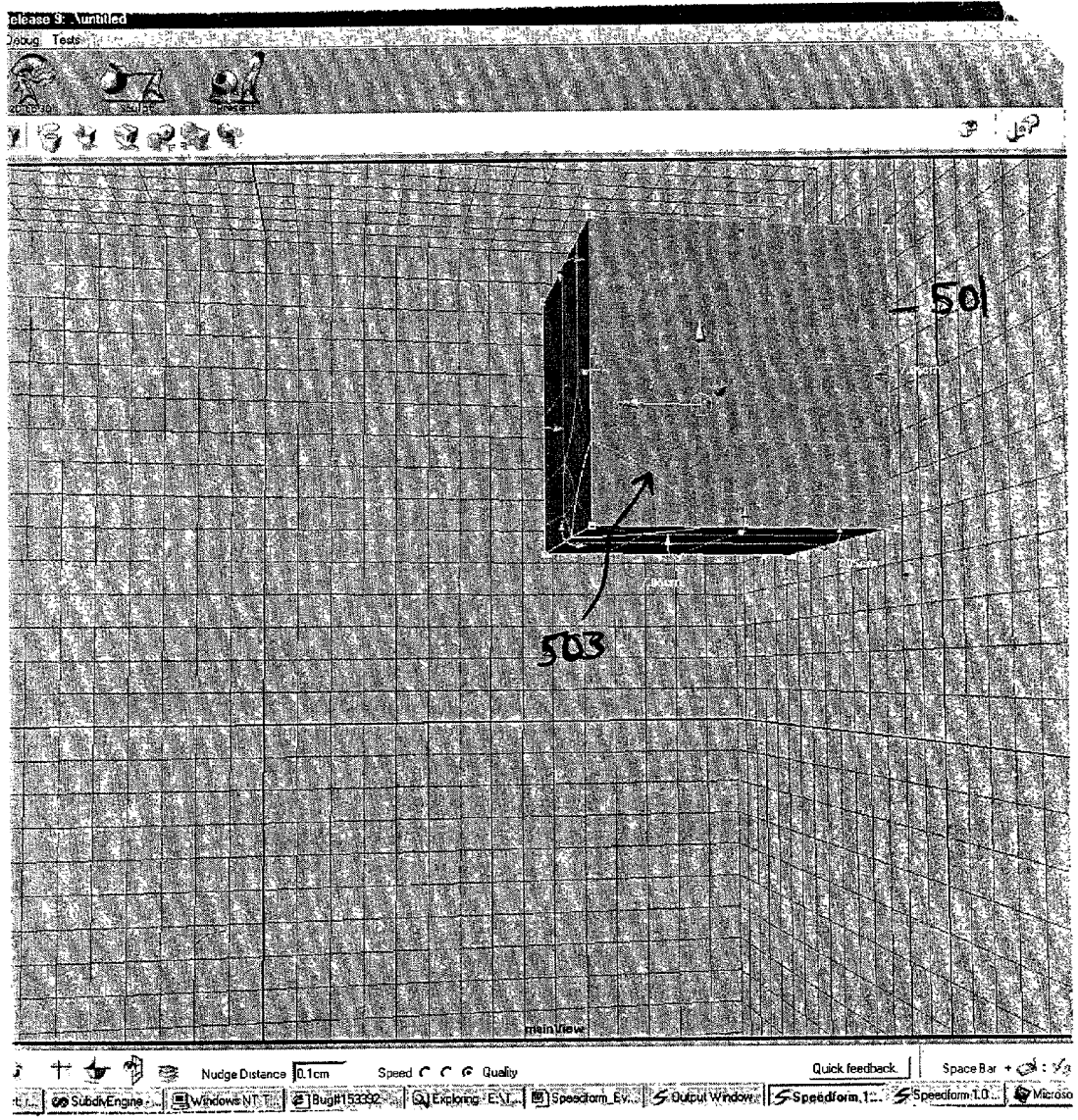
FIG. 5 illustrates a score operation of the inputs shown in FIG. 1, according to an embodiment of the present invention.

FIG. 5 illustrates a score operation of the inputs shown in FIG. 1, according to an embodiment of the present invention.

A score operation creates a face at an intersection of two inputs on one of the inputs. Scored cube 501 results from the scoring of sphere 101 (from FIG. 1) with cube 103 (from FIG. 1). Note the score marks 503 on scored cube 501. These score marks 503 represent the tracing of the intersection of the sphere 101 with the cube 103. Scoring does not affect the actual shape of the scored surface, or its texture or coloring. Scoring produces a new face as part of the scored surface itself. Note that while a 3-dimensional object is made of many faces, the exact shape of these faces may be somewhat arbitrary. Scoring produces a face of a certain shape on one of the inputs. Scoring is accomplished by keeping the pieces from the first surface that are inside and outside the second surface, and discarding all the pieces of the second surface. Scoring splits up the faces of the first surface into smaller faces. It is useful to create well-defined regions of the first surface to be used in subsequent operations, like coloring or extruding. For example, a user might create a complicated shape and use it to score (or "brand") an outline into a surface, and then change the color of the surface within the scored region.

Figure 6:
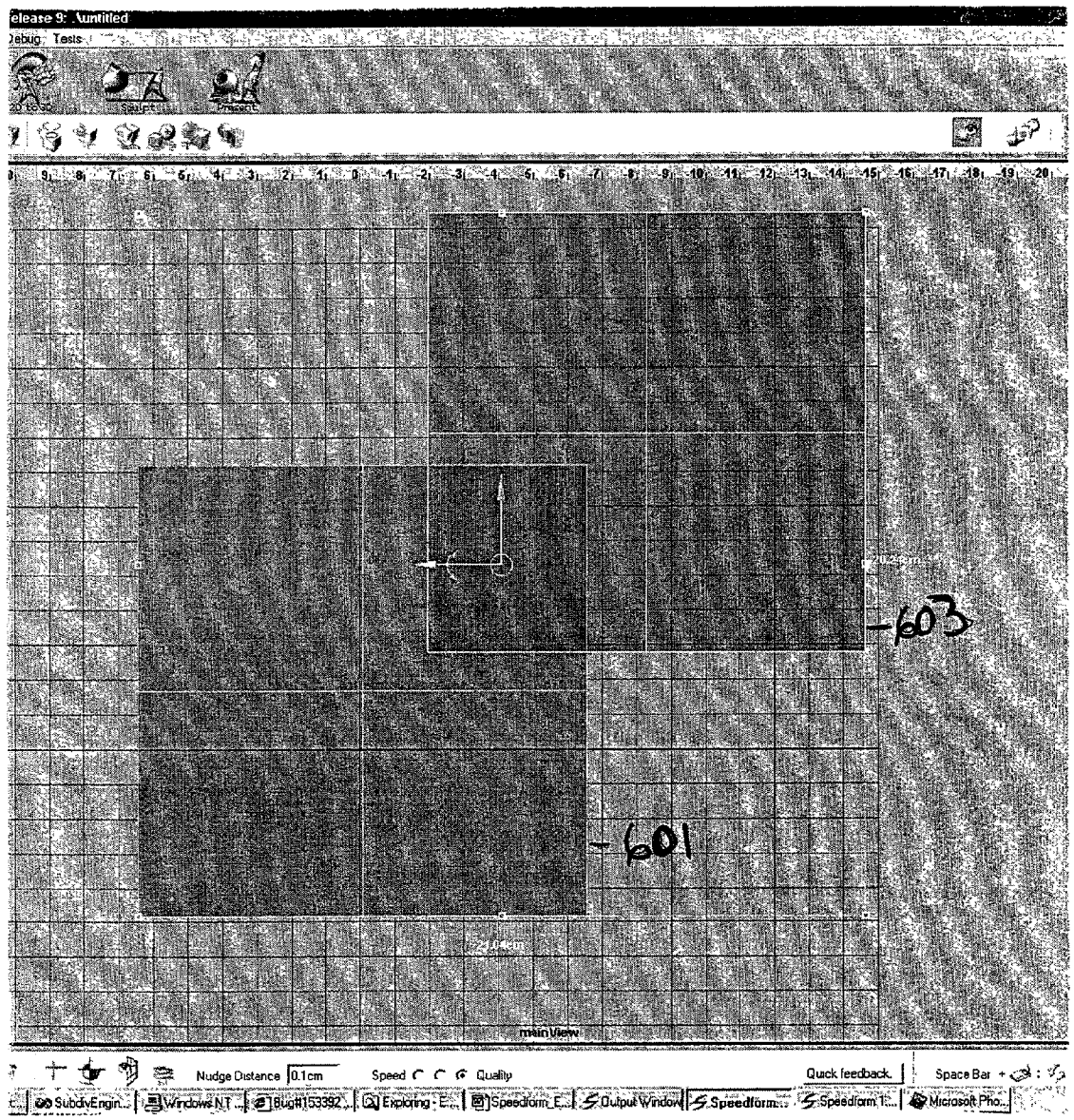
FIG. 6 illustrates two cubes as inputs, according to an embodiment of the present invention.

FIG. 6 illustrates two cubes as inputs, according to an embodiment of the present invention. Cube 601 and cube 603 are used as inputs for more example operations.

Figure 7:
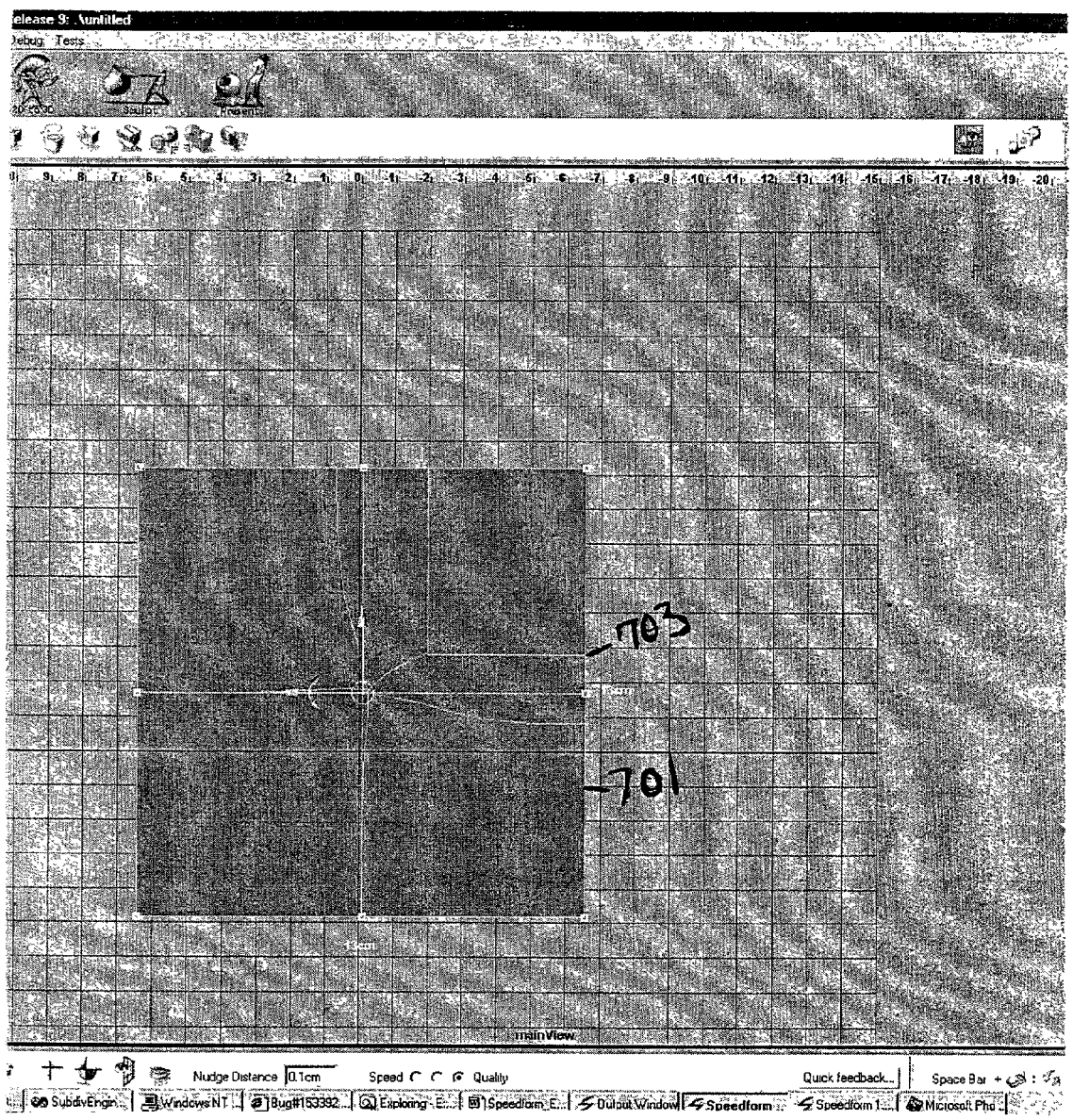
FIG. 7 illustrates a score operation of the inputs shown in FIG. 6, according to an embodiment of the present invention.

FIG. 7 illustrates a score operation of the inputs shown in FIG. 6, according to an embodiment of the present invention.

Scored cube 701 results from the scoring of cube 601 (from FIG. 6) and cube 603 (from FIG. 6). Score marks 703 represents the tracing of the intersection of cube 603 on cube 601.

Figure 8:
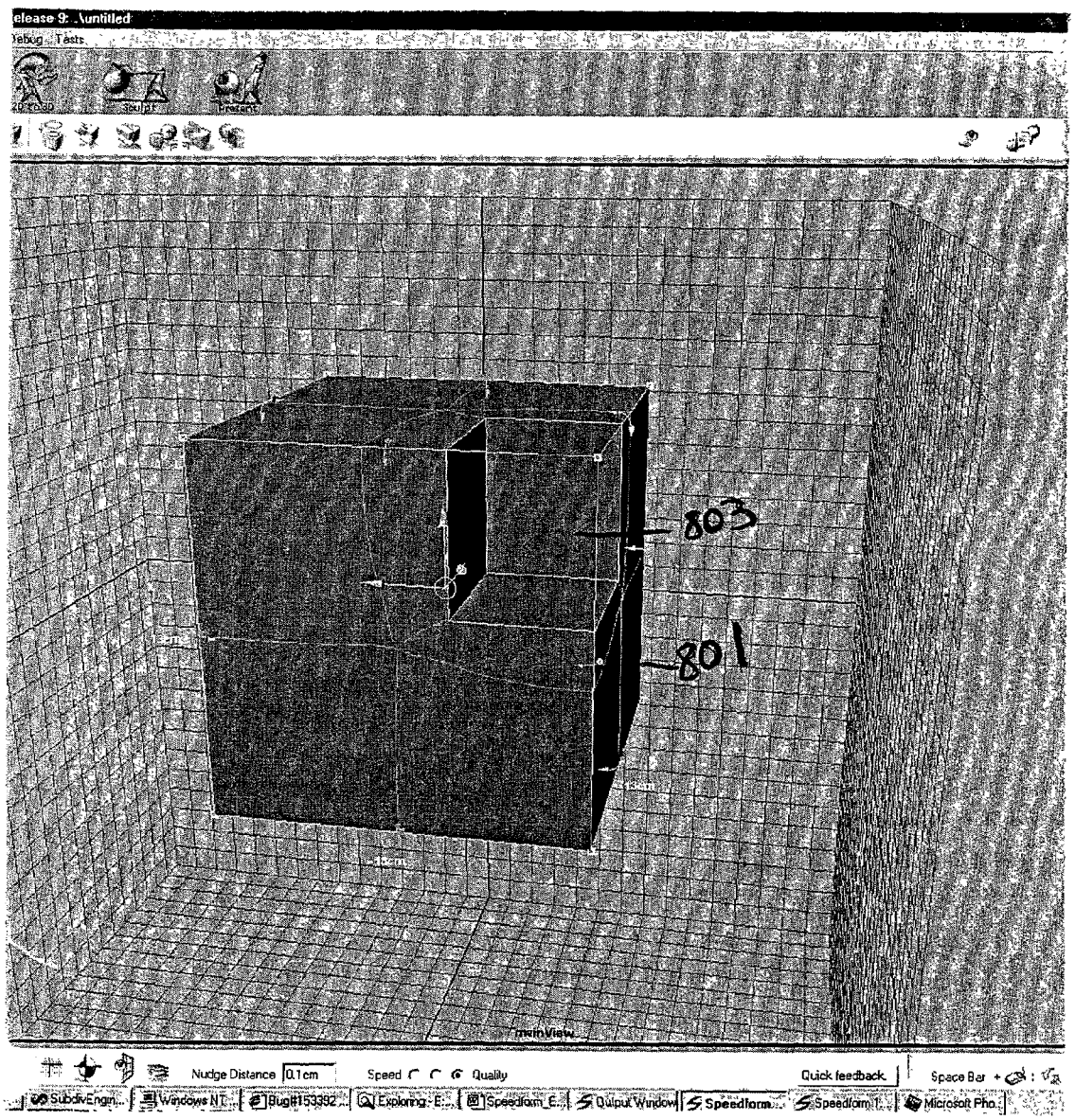
FIG. 8 illustrates a difference operation of the inputs shown in FIG. 6, according to an embodiment of the present invention.

FIG. 8 illustrates a difference operation of the inputs shown in FIG. 6, according to an embodiment of the present invention.

Difference cube 801 results from the subtracting of cube 603 (from FIG. 6) from cube 601 (from FIG. 6). Note the hole 803, which is actually the intersection of cube 601 and 603 subtracted from cube 601.

Figure 9:
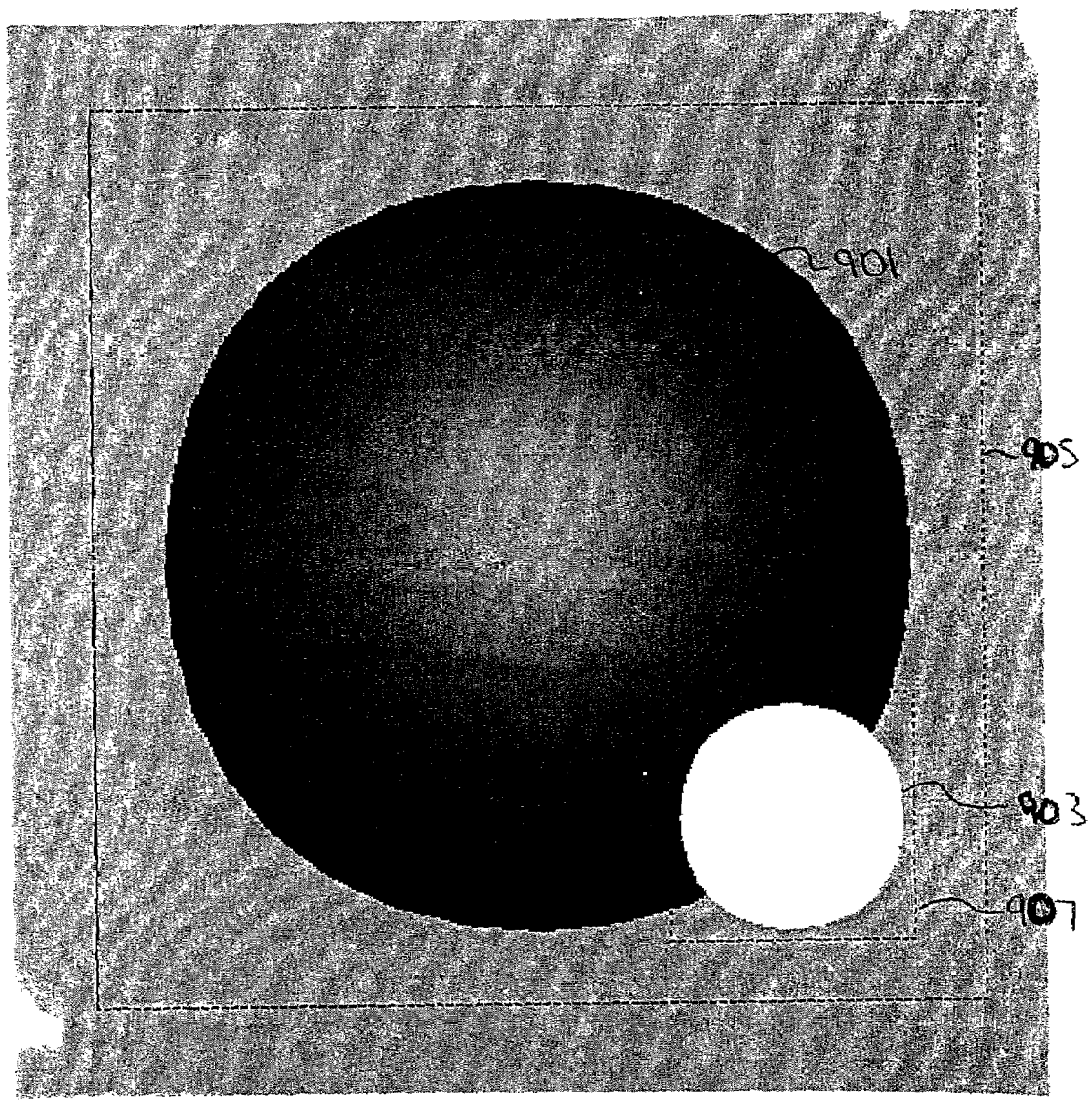
FIG. 9 illustrates two input subdivision surfaces; according to an embodiment of the present invention.

FIG. 9 illustrates two input subdivision surfaces; according to an embodiment of the present invention. Large sphere 901 and small cylinder (viewed end-on) 903 are subdivision surfaces made from large base mesh 905 and small base mesh 907, respectively. The front-most four edges and back-most four edges of the small base mesh 907 were creased to produce the small cylinder 903.

Figure 10:
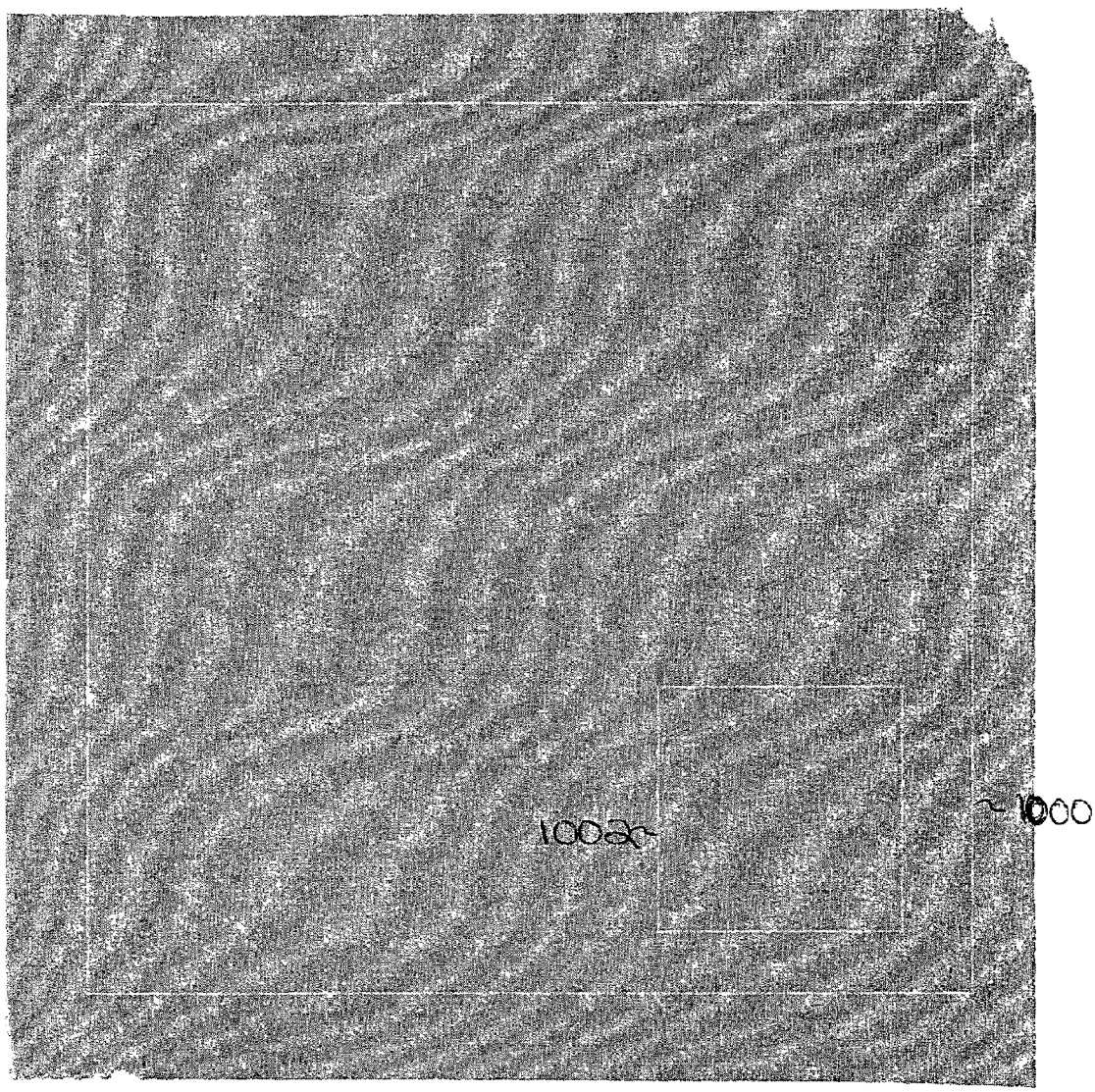
FIG. 10 illustrates corresponding base meshes for the subdivision surfaces in FIG. 9, according to an embodiment of the present invention.

FIG. 10 illustrates corresponding base meshes for the subdivision surfaces in FIG. 9, according to an embodiment of the present invention. Large base mesh 1000 and small base mesh 1002 are illustrated.

Figure 11:
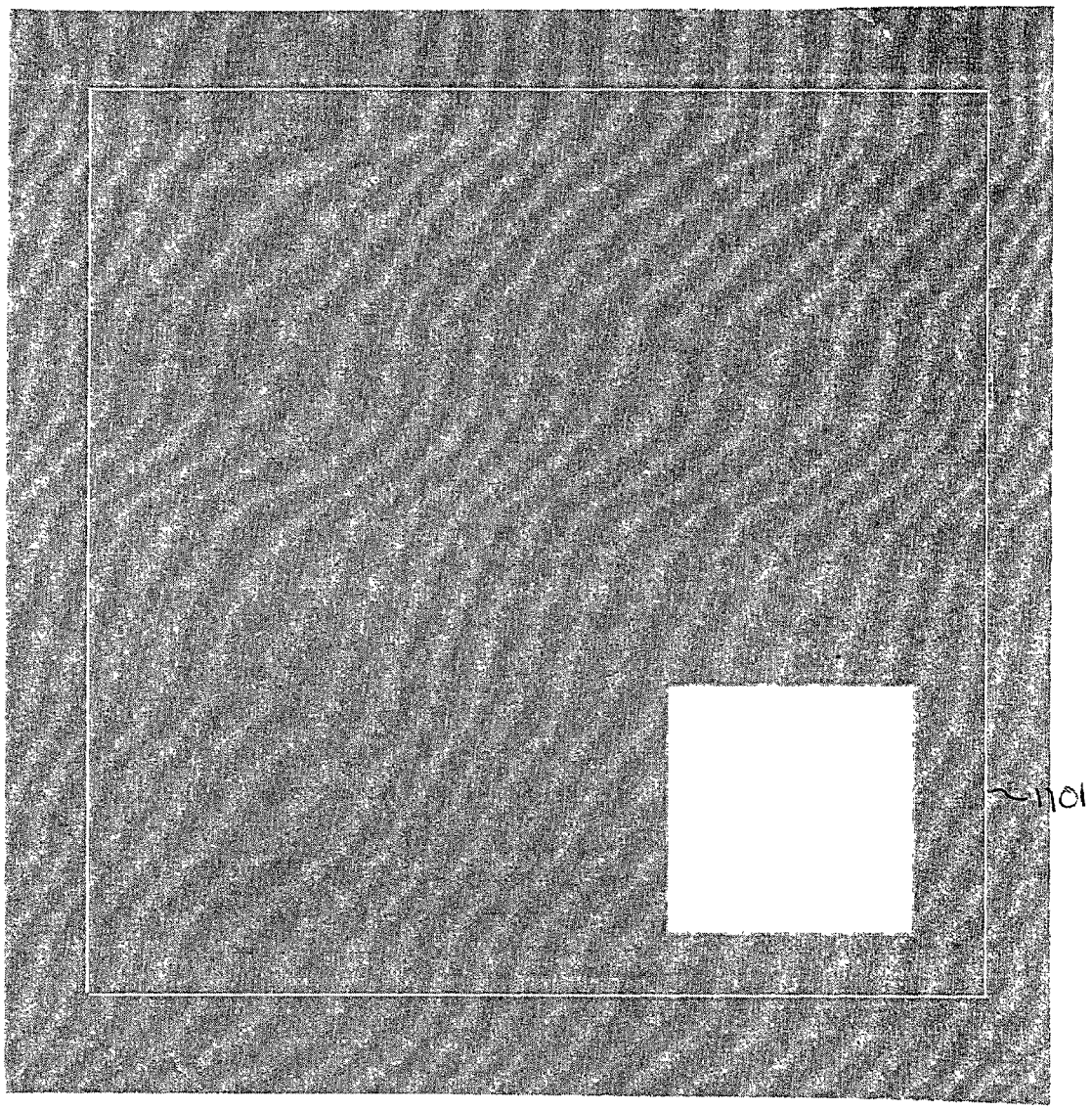
FIG. 11 illustrates a result from a Boolean polygon subtraction operation of the base meshes illustrated in FIG. 10, according to an embodiment of the present invention.

FIG. 11 illustrates a result from a Boolean polygon subtraction operation of the base meshes illustrated in FIG. 10, according to an embodiment of the present invention. Subtracted base mesh 1101 is the result of subtracting small base mesh 1003 (from FIG. 10) from large base mesh 1001 (from FIG. 10).

Figure 12:
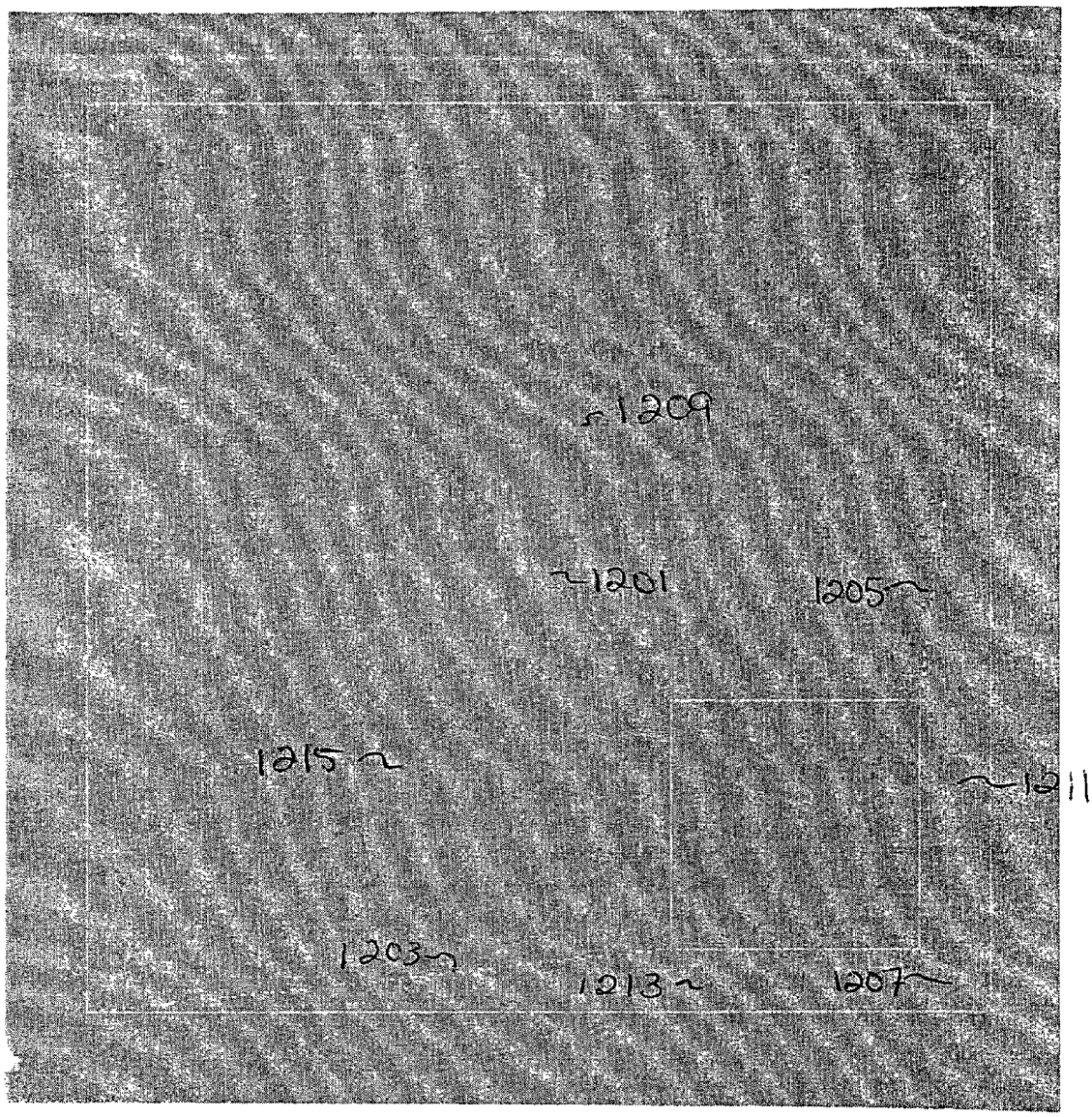
FIG. 12 illustrates the subtracted base mesh of FIG. 11, with edges added to make quadrilateral faces, according to an embodiment of the present invention.

FIG. 12 illustrates the subtracted base mesh of FIG. 11, with edges added to make quadrilateral faces, according to an embodiment of the present invention. Note edges 1101, 1103, 1105 and 1107 are added so all faces 1109, 1111, 1113, 1115, and 1117 are quadrilaterals. One method this can be accomplishes is by joining the corners of the square face 1117 with the edges of the perimeter of the mesh. This is done so that subdivision rules such as Catmull-Clark can easily be applied. More on the dividing into quadrilateral will be described below.

Figure 13:
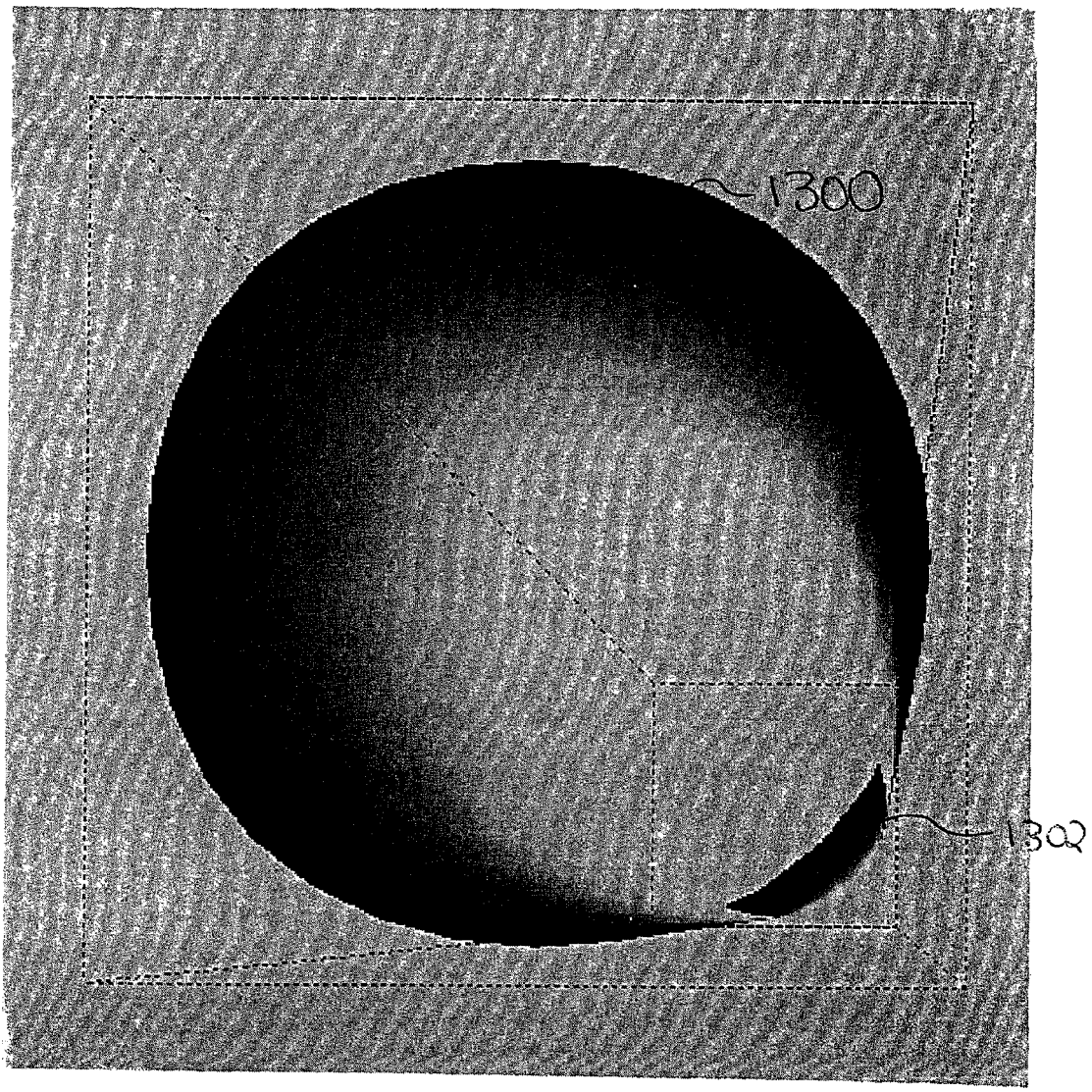
FIG. 13 illustrates a corresponding subdivision surface of the base mesh of FIG. 12.

FIG. 13 illustrates a corresponding subdivision surface of the base mesh of FIG. 12. Note a distorted "lump" 1302 on an edge of the subdivision surface 1300.

Figure 14:
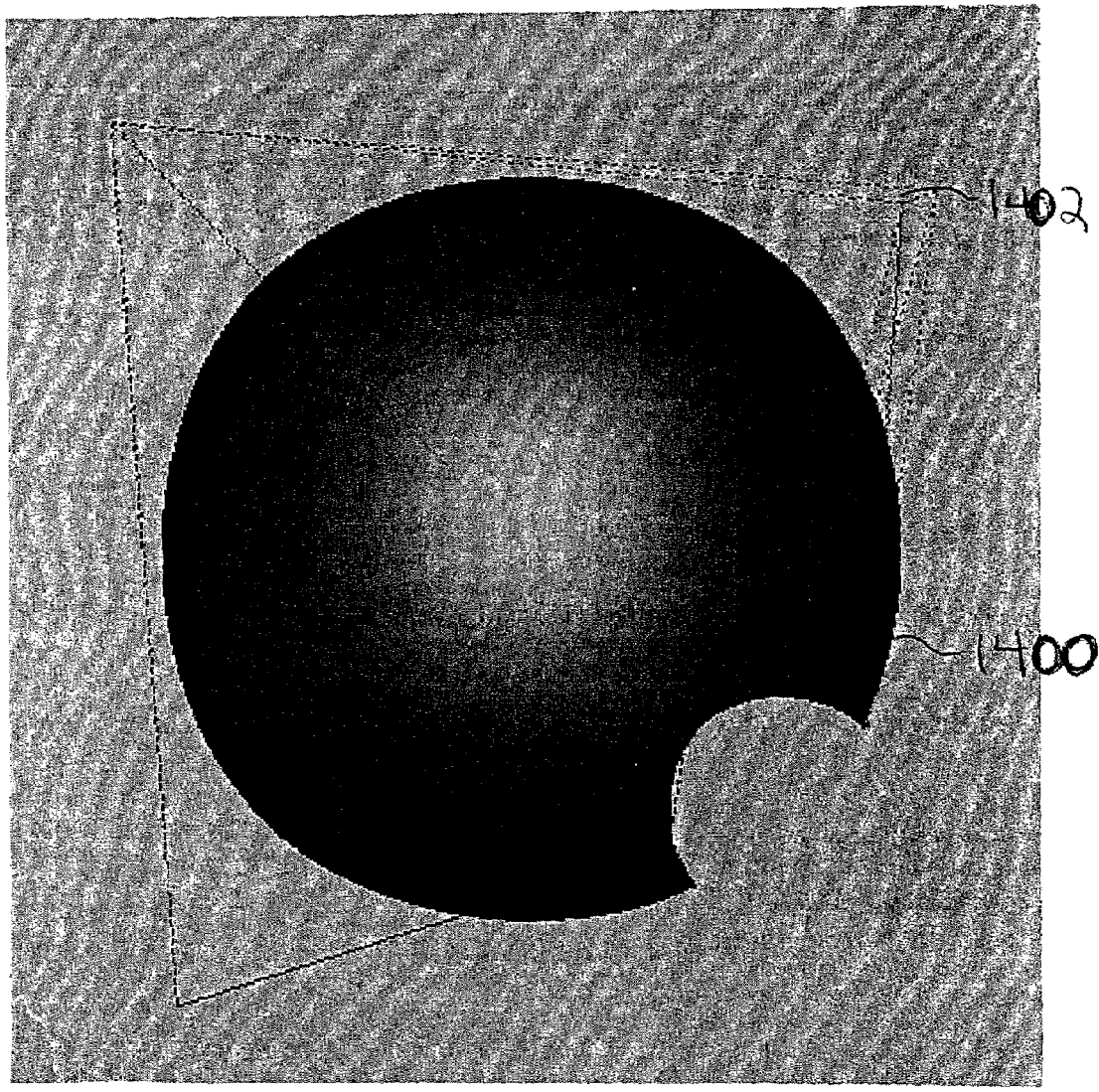
FIG. 14 illustrates the subtraction operation of the subdivision surfaces illustrated in FIG. 9 using methods of the present invention, according to an embodiment of the present invention.

FIG. 14 illustrates the subtraction operation of the subdivision surfaces illustrated in FIG. 9 using operations described below, according to an embodiment of the present invention. Note the subdivision surface 1400 is an accurate representation of the subtraction operation of small sphere 903 from large sphere 901 (from FIG. 9). Base mesh 1402 represents the base mesh used to create the subdivision surface 1400. The methods described below will describe how base mesh 1402 is determined.

Figure 15:
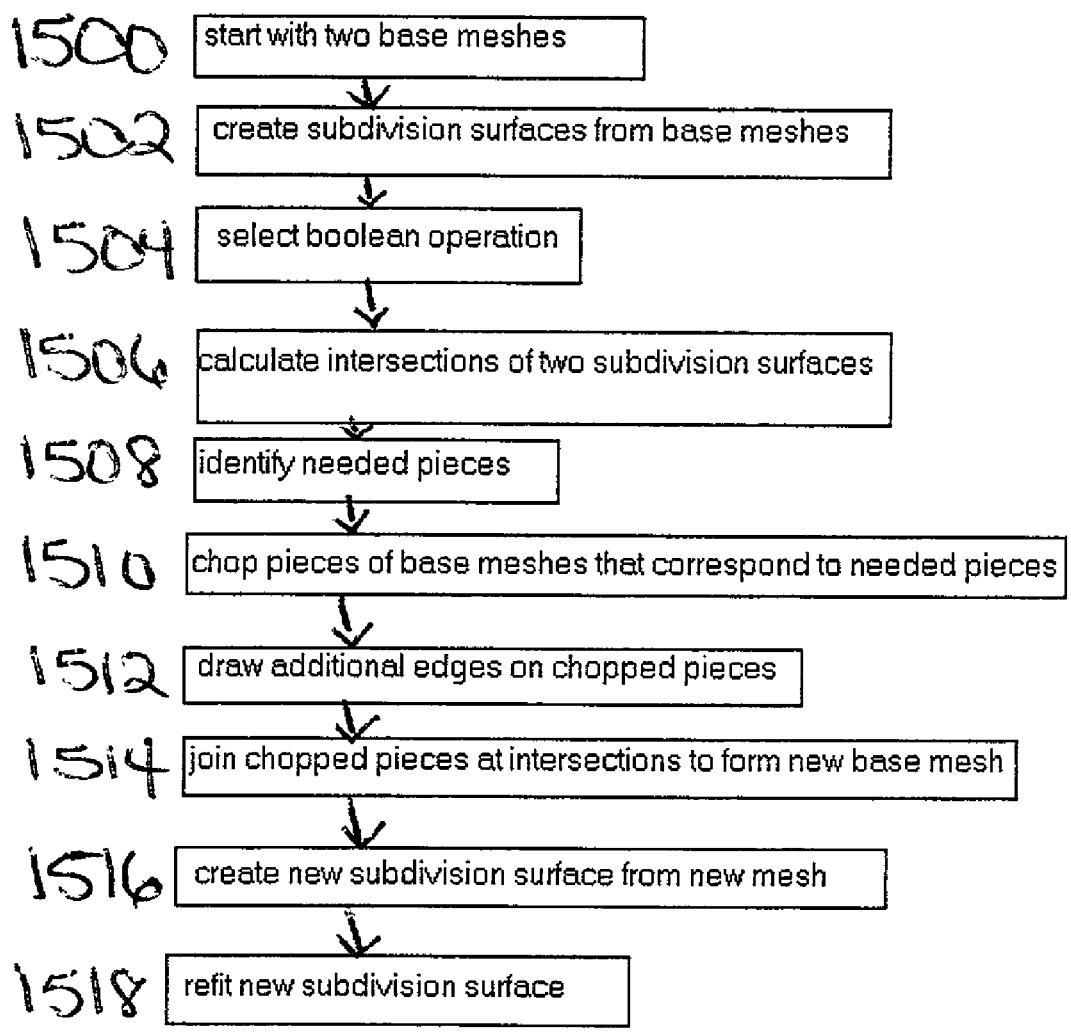
FIG. 15 illustrates a flowchart describing a method used to implement the present invention, according to an embodiment of the present invention.

FIG. 15 illustrates a flowchart describing a method used to implement the present invention, according to an embodiment of the present invention. The operations illustrated and their sequence listed may be modified or rearranged, as FIG. 15 illustrates merely one example of how operations of the present invention can be performed.

The method of the present invention can start 1500 with two base meshes. The two base meshes can be created by any conventional method, for example using a commercial program such as MAYA® available from ALIAS|WAVEFRONT.

Then the method creates 1502 subdivision surfaces from the base meshes. This can also be accomplished using any conventional method, for example using a commercial program such as MAYA ®, available from ALIAS|WAVEFRONT.

A user then selects 1504 a Boolean operation. The Boolean operation can be selected from any known Boolean operation, for example (but not limited to) union, intersection, difference, and score The method then calculates 1506 intersections of two subdivision surfaces. One way of performing this calculation is by approximating each face of each subdivision surface by a Bezier patch (a book entitled, "An Introduction to Splines for use in Computer Graphics and Geometric Modeling," by Bartels, Beatty, and Barsky, explains this technique), and using known techniques for calculating the intersections of Bezier patches. Calculating the intersections of the surfaces results in the two subdivision surfaces being divided into different pieces. This is done so that we know what actual pieces may be needed for a Boolean result, so we can subsequently calculate what the result of the operation will be.

Then, the method identifies 1508 needed pieces. The identification is done pursuant to the actual Boolean operation selected. For example, if the selected Boolean operation is a Union, then all the pieces of each surface that are outside the other surface are identified. Likewise, for the intersection operation, all the pieces of each surface that are inside the other surface are identified. For difference, all the pieces of the first surface that are outside the second surface, and all the pieces of the second surface that are inside the first surface, are identified. The identification is performed by first performing the method that computes the surface intersections which can identify whether the portions of a surface to the left and right of the intersection curve are inside or outside of the other surface, by looking at the local surface normals (standard in good surface intersection methods). Then, this inside/outside information attached to the intersection curves is propagated to all of the adjacent pieces of the surfaces until every piece is labeled as either inside or outside of the other surface. Once each piece is labeled inside or outside, then the appropriate pieces are selected which are needed for the desired Boolean operation. This is done so we know the actual result of the Boolean operations, so we can create a new mesh to match these pieces later.

After the needed pieces are identified, then the method chops 1510 pieces of the base mesh that correspond to the needed pieces. Each needed piece of a subdivision surface comes from a unique base mesh polygon, which we know from the storage of the subdivision surface itself. Intersection curves tell us which base mesh edges to chop and where to chop them. This is done so that we can subsequently create a new mesh, which matches the needed pieces. The chop can be done directly on the mesh without refining the mesh into smaller pieces first.

After the respective pieces of the base mesh are chopped, then the method creates 1512 additional edges on chopped pieces. The additional edges are created to make quadrilaterals and triangles so that the Catmull-Clark subdivision rules can be properly applied. Convex quadrilaterals are formed, however triangles may still be needed instead of concave quadrilaterals. Additional edges are created until each face of the chopped pieces is a quadrilateral or triangle, although quadrilaterals are preferred. More on the creating (or adding) of edges will be described below. A planar polygon is known as convex if it contains all the line segments connecting any pair of its points. A planar polygon that is not convex is said to be a concave polygon. Ideally, as many convex polygons are created as possible, and then triangles are created when convex polygons are no longer possible to create.

After the new edges are created, the method then joins 1514 the chopped pieces at intersection points (calculated in operation 1506), creating a new base mesh. The joining moves the pieces of the base mesh that have to be moved to connect to the respective intersection point. The intersection point that they are joined at can correspond to the limit point of the end point of each chopped base mesh. Each control vertex resulting from the chopping of a base mesh edge is moved to coincide with a point of intersection. This guarantees that the chopped base meshes can be joined, and insures that the new base mesh edges along the join (which we tag as creased) will approximate the true intersection curve when subdivision takes place.

Once the new mesh is created from operation 1514, then a new subdivision surface can be generated using convention methods. The new subdivision surface represents a result of the selected Boolean operation applied to the original two base meshes. The new subdivision surface may contain some inaccuracies, based upon the fact that a single new base mesh has now been created which approximates what might be a complex surface. Thus, refitting may be desirable.

The method then may refit 1518 the newly created base mesh so that the resultant subdivision surface more closely matches the identified needed pieces identified in operation 1908. The refitting operation alters the new base mesh, and results in a resultant subdivision surface that more closely matches the identified needed pieces (i.e. what the result of the Boolean operation should be). More on the refitting operation will be described below.

Figure 16:
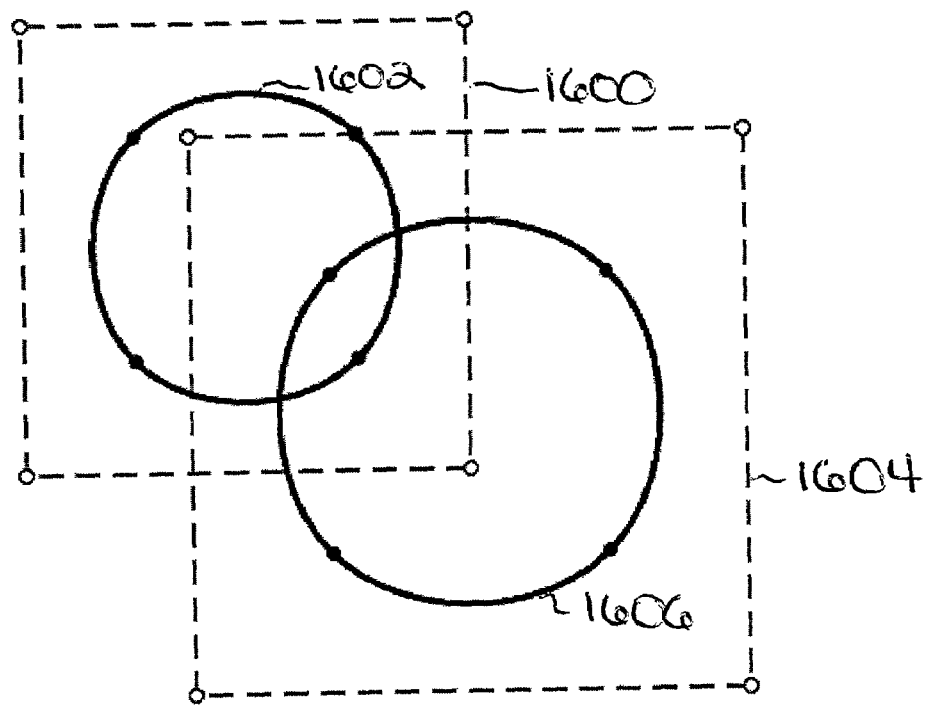
FIG. 16 illustrates original 2-dimensional subdivision curves and their respective base meshes, according to an embodiment of the present invention.

FIG. 16 illustrates original 2-dimensional subdivision curves and their respective base meshes, according to an embodiment of the present invention. While the methods of the present invention can be implemented in any number of dimensions, they are illustrated here in two dimensions for simplicity. Left base mesh 1600 subdivides to create left subdivided surface 1602. Right base mesh 1604 subdivides to create right subdivided surface 1606.

Figure 17:
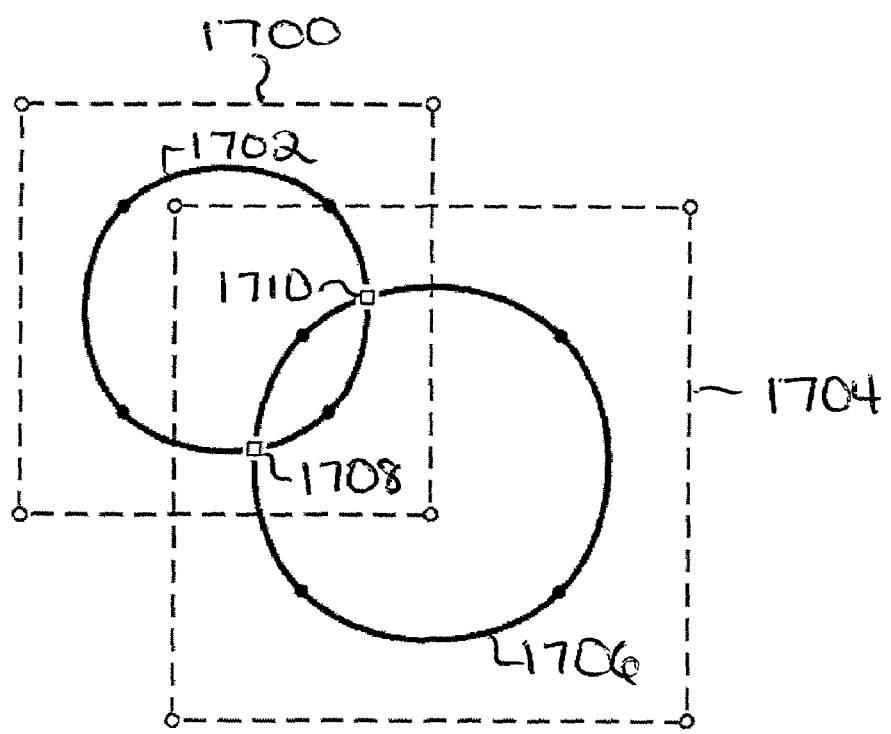
FIG. 17 illustrates intersection points of the original subdivision curves illustrated in FIG. 16, according to an embodiment of the present invention.

FIG. 17 illustrates intersection points of the original subdivision curves illustrated in FIG. 16, according to an embodiment of the present invention. Intersection point 1 1708 and intersection point 2 1710 lie at the intersection of left subdivided surface 1702 and right subdivided surface 1706. The intersection points are calculated by approximating each span of the subdivision curve by a Bezier curve, and calculating the intersection of those Bezier curves using standard techniques.

Figure 18:
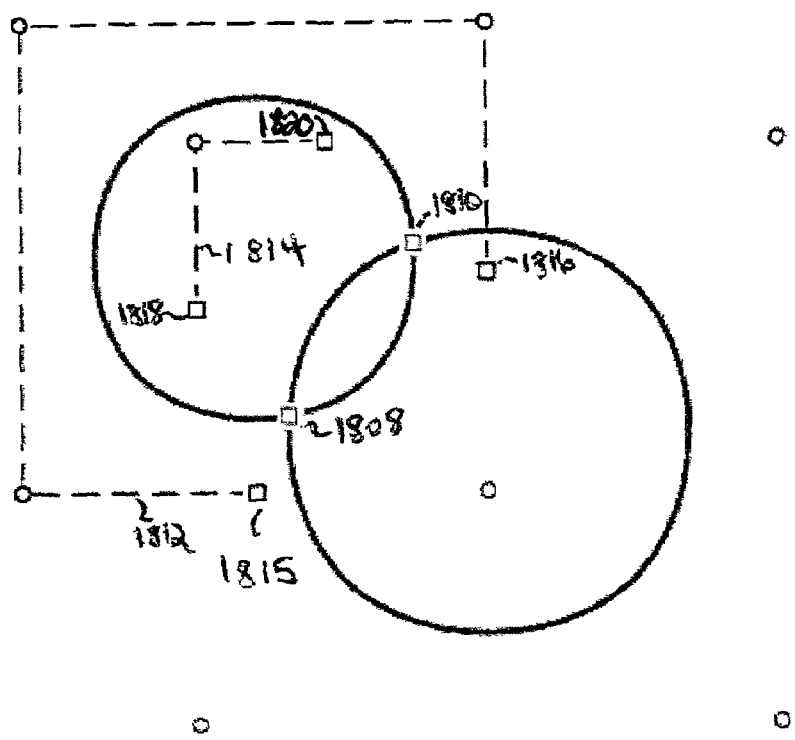
FIG. 18 illustrates the base meshes from FIG. 18 chopped, according to an embodiment of the present invention.

FIG. 18 illustrates the base meshes from FIG. 18 chopped, according to an embodiment of the present invention. The bases meshes are chopped according to the intersection points. For example, chopped left base mesh 1812 is a chopped portion of the original left base mesh. Left endpoints 1815 and 1816 are calculated so that intersection points 1808 and 1810 are their limit points, respectively. Then, the original left base mesh is chopped at these end points 1815 1816 to produce chopped left base mesh 1812. Similarly, right end points 1818 1820 are calculated, so that the intersection points 1808, 1810 are their limit points, respectively. Then the original right base mesh is chopped at these end points 1818 1820 to produce chopped right base mesh 1814.

Figure 19:
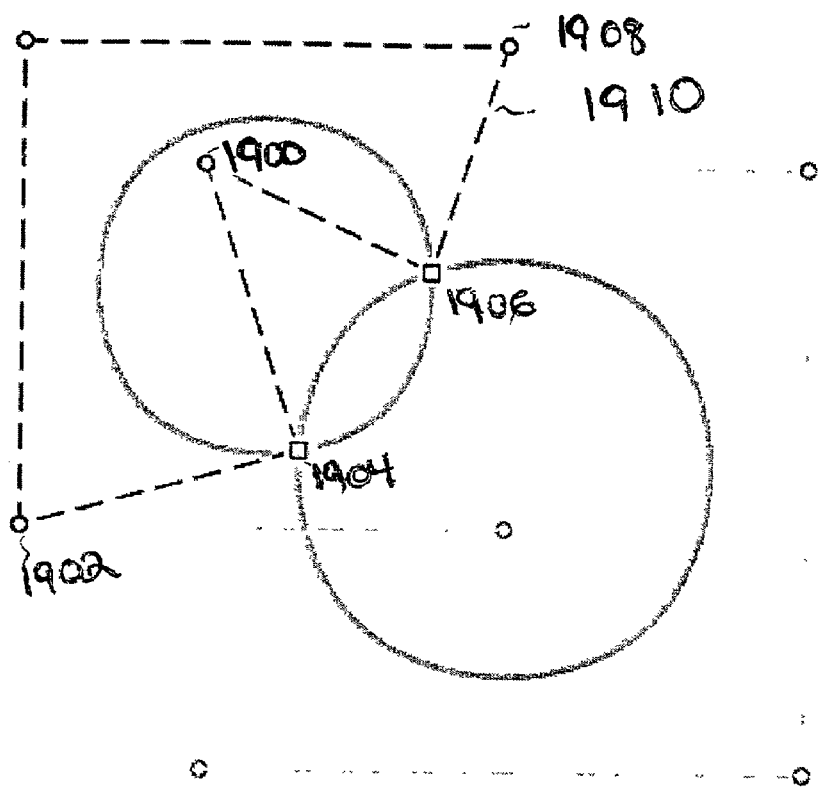
FIG. 19 illustrates a new base mesh created after joining chopped base mesh edges illustrated in FIG. 18, according to an embodiment of the present invention.

FIG. 19 illustrates a new base mesh created after joining chopped base mesh edges illustrated in FIG. 18, according to an embodiment of the present invention. New joined mesh 1910 is formed by adjusting and joining the left base mesh 1912 and right base mesh 1914 from FIG. 18. Left base mesh vertex 1815 (from FIG. 18) is moved to the intersection point 1904. Left base mesh vertex 1816 (From FIG. 18) is moved to the intersection point 1906. Right base mesh vertex 1818 (from FIG. 18) is moved to the intersection point 1904. Right base mesh vertex 1816 (from FIG. 18) is moved to the intersection point 1906. Thus, both the left base mesh and the right base mesh are now joined into a joined mesh 1910. These "loose" points on each base mesh are joined with the other base mesh.

Figure 20:
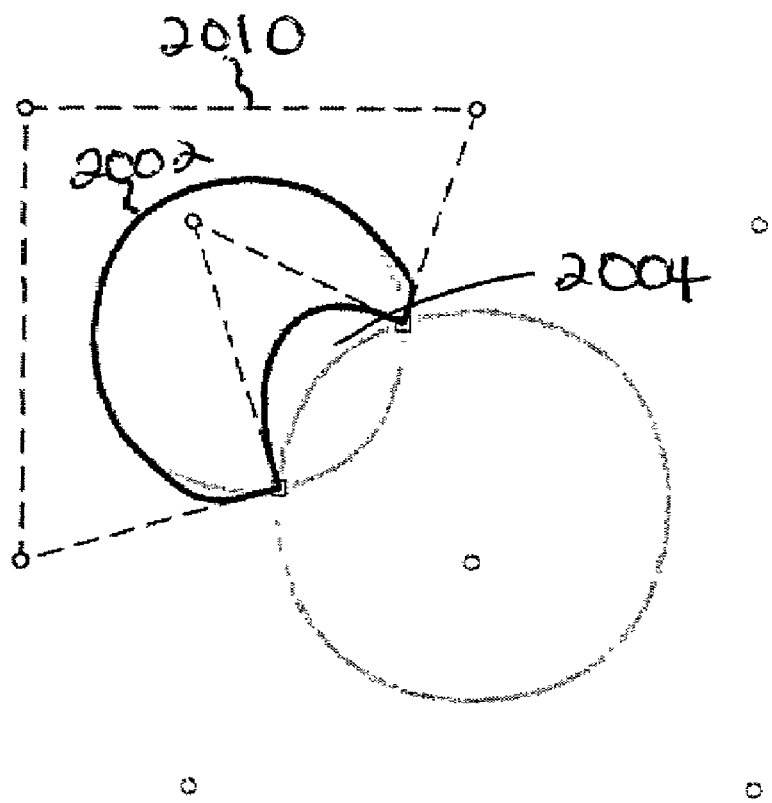
FIG. 20 illustrates a comparison of a new subdivision curve to the previous subdivision curves, according to an embodiment of the present invention.

FIG. 20 illustrates a comparison of a new subdivision curve to the previous subdivision curves, according to an embodiment of the present invention. Subdivision curve 2002 is formed from subdivided the joined mesh 2010. Note that subdivision curve 2002 is slightly distorted from corresponding parts of the subdivided surface 2004 that it should match.

Figure 21:
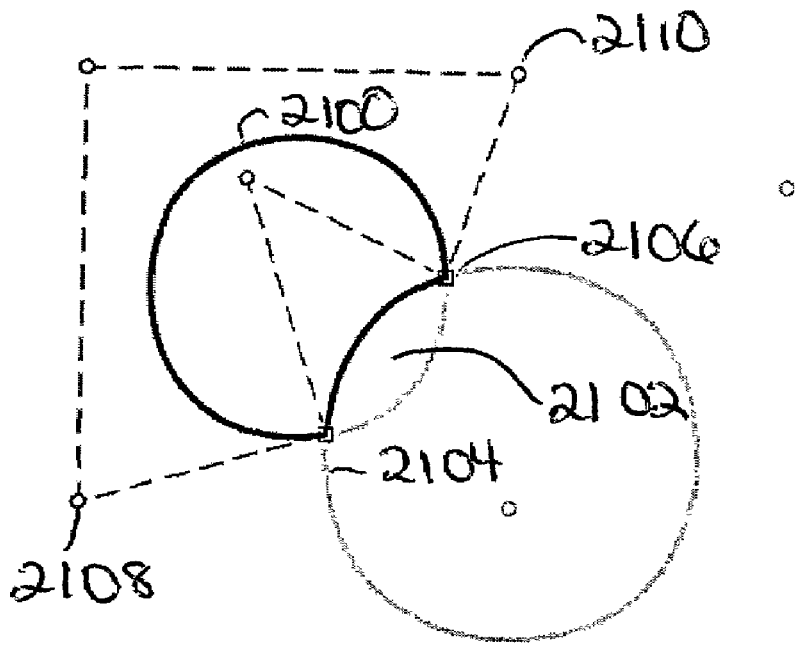
FIG. 21 illustrates a new subdivision curve after fitting to the original subdivision curves, according to an embodiment of the present invention.

FIG. 21 illustrates a new subdivision curve after fitting to the original subdivision curves, according to an embodiment of the present invention. The subdivision curve 2002 (from FIG. 20) is refit to match the original subdivided surfaces. Note that subdivision curve 2100 matches subdivided surface 2102 (the right circle) at appropriate parts (between intersections 2104 2106). More on the refitting operation will be described below.

FIG. 22A illustrates the chopping, merging, and comparison operations for the same inputs illustrated in FIG. 16 but for a Boolean Union operation. The chopping operation 2200 is illustrated. The darkened portion of the two circles represents the original Boolean union result 2201 of these circles. The chopped base meshes 2202 corresponding to the parts of the original union (as discussed above) are also calculated. The method identified which pieces of the base meshes to chop because the method that computes intersections records which portions of the base meshes are involved in the calculation, and the inside/outside status of both curves to the left and right of each intersection point.

The merging base meshes operation 2208 is illustrated. Base mesh endpoints 2204 and 2603 are moved and merged at intersection point 2209. Base mesh endpoints 2205 and 2206 are moved end merged at intersection point 2210.

The comparison 2214 compares a new subdivision surface created from the modified base mesh 2216 to the original surfaces 2218. Note there is not an exact match. The fitting operation (described in more detail below) can be used to modify the base mesh so that the new subdivision surface more closes matches the original surface.

FIG. 22B illustrates the chopping, merging, and comparison operations for the same inputs illustrates in FIG. 16 for a Boolean Difference operation. FIG. 22B is identical to some of the figures previously presented and is included for comparison purposes. The chopping operation 2230, merging base meshes operation 2232, and comparison 2234 is shown. These operations operate as described above, but with respect to the difference operation and the original Boolean difference result 2231.

FIG. 22C illustrates the chopping, merging and comparison operations for the same inputs illustrated in FIG. 16 for but for a Boolean Intersection operation. The chopping operation 2260, merging base meshes operation 2262, and comparison 2264 is shown. These operations operate as described above, but with respect to the difference operation and the original Boolean difference result 2261.

FIGS. 23A, 23B, 23C, 23D illustrate adding edges to a base mesh. This is typically done after the chopping but before chopped base meshes are merged. As stated previously, this operation is done so the Catmull-Clark subdivision rules can be applied.

FIG. 23A illustrates a base mesh comprising a square 2302 with a smaller square 2300 chopped out of it. FIG. 23B illustrates the base mesh of FIG. 23A with additional edges created to create quadrilaterals. Edges 2305, 2307, 2309, 2311 are added which create quadrilaterals 2304, 2306, 2308, 2310. The additional edges are added by connecting each corner of the smaller square 2300 with each corner of the square 2302.

FIG. 23C illustrates a base mesh comprising a triangle 2312 with a smaller square 2314 chopped out of the triangle 2312. FIG. 23D illustrates the base mesh of FIG. 23C with additional edges added to make faces 2315, 2317, 2319, 2321, 2323, 2325. In this case, there is no easy way to make all quadrilaterals so triangular faces are also created.

FIG. 24 illustrates chopping base meshes, adding edges, and combining base meshes. Cube base mesh 2400 is a cube with creased edges, resulting in limit surface 2402. Rectangular base mesh 2404 is a base mesh which results in limit surface 2406. A union of these surfaces will be illustrated.

Union surface 2408 is created (using the techniques described above), which is the union of the cube base mesh 2400 and the rectangular base mesh 2404 placed in the middle of the cube base mesh 2400.

According to the above-described methods, intersections of the two subdivision surfaces are computed and each base mesh is chopped at the appropriate parts (see above discussion). The meshes are chopped to form portions, which will result in the limit surfaces of the needed pieces of the union operation after an intersection. Chopped cube base mesh 2408 is the cube base mesh 2400 after the unneeded pieces are chopped (see above discussion). Hole 2414 is a piece of chopped cube base mesh 2408 cut out, because this defines where the limit surfaces of each base mesh intersect. Note edges 2409, 2410, 2411, and 2412 are not part of the original chopped base mesh but were created as discussed above to facilitate implementing the Catmull-Clark subdivision rules. Chopped rectangular base mesh 2415 is the entire rectangular base mesh 2404. Chopped rectangular needed part mesh 2418 is the part of the chopped rectangular base mesh 2415, which is needed. Chopped rectangular unneeded part 2416 is the part of the chopped rectangular base mesh 2415, which is not needed. It is not needed because a union operation is being performed, which discards redundant pieces. Because Chopped rectangular needed part 2418 contains quadrilateral faces, no additional edges need be added.

Boolean base mesh 2420 is the chopped cube base mesh 2408 and the chopped rectangular needed part mesh 2418 merged. Typically, when base meshes are merged, any added edges should be adjusted to when points the new edges connect to are moved. In the case illustrated in FIG. 24, though, the new edges are not moved.

Boolean base mesh 2420 is now a Catmull-Clark base mesh which subdivides to produce Boolean limit surface 2422. Boolean limit surface 2422 represents the union of the limit surface 2402 and limit surface 2406 (placed in the middle of limit surface 2402).

FIG. 25 illustrates a flowchart describing a method used to implement the refitting operation of the invention, according to an embodiment of the present invention. The refitting operation, as discussed above, modified the newly created base mesh so it produces a resultant subdivision surface, which more closely matches a result of the selected Boolean operation.

The refitting selects 2500 a vertex on the new mesh. The vertex can be selected in any manner, such as stepping through each vertex in the new base mesh or even randomly.

The refitting then calculates 2502 the vertex's limit point on the new subdivision surface. This is accomplished by using a formula that gives the exact limit point, given the positions of the neighboring control vertices. See Halstead, Kass, and DeRose reference.

The refitting also identifies 2504 the corresponding point on the original subdivision surface. This is accomplished by storing a mapping that designates for each polygon of the new base mesh, which polygon of which initial base mesh it comes from, and which portion of that polygon it corresponds to if it was chopped. That way, the method can always calculate parameter values within an initial base mesh polygon that will give us a point corresponding to any control vertex (at any level of subdivision) of the new surface. For example, if one of the new base mesh edges comes from parameter values 0.152 to 0.536 of some initial base mesh edge, then we know that the new control vertex you get by subdividing the new base mesh edge is halfway along; thus, we need to evaluate the initial subdivision surface at parameter value (0.152+0.536)/2=0.344 along the initial base mesh edge. For a vertex in the interior of a face, there are two parameter values (u, v) that define where within a face we need to evaluate the initial subdivision surface. The method described in Stam can be used to exactly evaluate limit points corresponding to these parameter values.

The refitting then compares 2506 displacements of the limit point calculated in operation 2502 with the corresponding point calculated in 2504 and computes a displacement between the two points. This displacement is a measure of inaccuracy. A displacement of zero implies that the selected vertex on the new mesh, the base mesh fits perfectly. Note however that one vertex may fit perfectly, while another vertex on the same new mesh may not.

From operation 2506, the method may repeat for additional vertices, if desired, and return to operation 2500.

After each vertex (or selected vertices) has been processed, the resultant subdivision surface created from the new base mesh still may not be as accurate as desired. Before moving a control vertex during fitting, it is calculated how far it is going to be moved. If that distance is below some tolerance, then it does not have to be moved. If greater accuracy is desired, then the original base mesh can be subdivided. Then each vertex (or selected vertices) of the subdivided base mesh can now be processed as described in operations 2500–2506. The original base mesh can then even be subdivided further, and operations 2500–2506 repeated again, as many times as desired.

The operations 2500–2508 described above will be better appreciated with an example, as presented below.

Figure 26A:
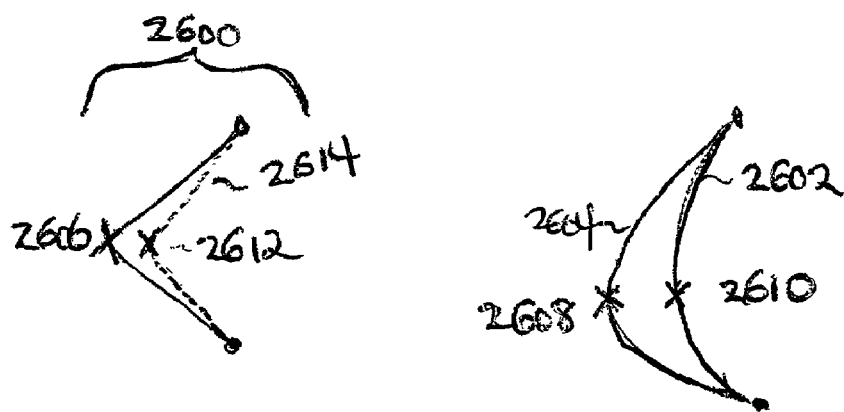
FIG. 26A illustrates a refitting operation, according to an embodiment of the present invention.

FIG. 26A illustrates a refitting operation, according to an embodiment of the present invention. New base mesh 2600 represents a new base mesh created by the methods of the present invention as discussed above. New base mesh 2600 subdivides to create curve 2604. Original curve 2802 is the curve that the new base mesh 2600 should ideally create by subdivision.

New base mesh vertex X 2606 is selected (operation 2500 from FIG. 25) and its corresponding points, curve vertex X 2608 and original curve vertex X 2610 are determined (operations 2502 and 2504 from FIG. 25). The displacement between curve vertex X 2608 and original curve vertex X 2610 is calculated (operation 2506 from FIG. 25). New base mesh vertex X 2606 is then moved by an amount based on the displacement (operation 2506 from FIG. 25). The amount moved may not be the exact displacement, but instead is moved so that point 2610 is its limit point. The limit point formula in the Halstead et al. reference is easy to invert, so one control vertex position can be computed given a desired limit point and all the neighboring control vertex positions.

Once new base mesh vertex X 2606 is moved by the calculated amount to new base mesh vertex X 2612, a modified new base mesh 2614 is created (shown by the dotted line) which more closely subdivides into the original curve 2602.

Figure 26B:
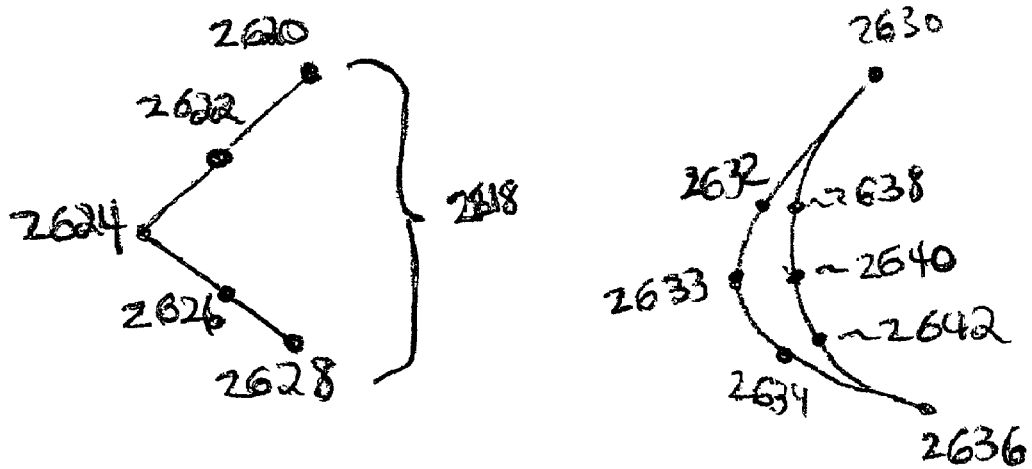
FIG. 26B illustrates a continuation of the refitting operation of FIG. 26A, according to an embodiment of the present invention.

FIG. 26B illustrates a continuation of the refitting operation of FIG. 26A, according to an embodiment of the present invention. The modified new base mesh 2614 may still not subdivide into original curve 2602 as accurately as desired. Thus, the modified new base mesh 2614 can be subdivided (operation 2508 from FIG. 25).

Subdivided modified new base mesh 2618 represents modified base mesh 2614 (from FIG. 26A) but subdivided to create further vertices. This subdivision can be accomplished in any conventional manner. Vertices on the subdivided modified new base mesh 2618 are 2620, 2622, 2624, 2626, and 2628. These points respectively correspond to points 2630, 2632, 2633, 2634, and 2636 on the curve corresponding to the subdivided modified new base mesh 2618. Points 2630, 2638, 2640, 2642, and 2636 on the original curve correspond respectively to the aforementioned points as well. The refitting methods described above can now be applied to subdivided modified new base mesh 2618.

FIG. 27A illustrates the refitting operations continuing the examples illustrated in FIG. 22A according to an embodiment of the present invention. Block 2700 illustrates an improved match obtained by fitting base mesh (level 0) control vertices. Block 2702 illustrates a further improved match obtained by fitting level one control vertices. Block 2704 illustrates a new subdivision curve after fitting the modified base mesh to the original subdivision curves.

FIG. 27B illustrates the refitting operations continuing the examples illustrated in FIG. 22B for a Boolean Difference operation, according to an embodiment of the present invention. Block 2710 illustrates an improved match obtained by fitting base mesh (level 0) control vertices. Block 2712 illustrates a further improved match obtained by fitting level one control vertices. Block 2714 illustrates a new subdivision curve after fitting the modified base mesh to the original subdivision curves.

FIG. 27C illustrates the refitting operations continuing the examples illustrated in FIG. 22C for an Intersection operation, according to an embodiment of the present invention. Block 2720 illustrates an improved match obtained by fitting base mesh (level 0) control vertices. Block 2722 illustrates a further improved match obtained by fitting level one control vertices. Block 2724 illustrates a new subdivision curve after fitting the modified base mesh to the original subdivision curves.

In another embodiment of the present invention, relaxed fitting can be used which calculates additional optimized vertices for refitting. As previously described, vertices for refitting can be selected merely by subdividing the base mesh further and fitting those vertices to form a better fit. Relaxed fitting improves on the selection of these refit vertices.

FIG. 28 illustrates a flowchart describing a method used for relaxed fitting, according to an embodiment of the present invention. Generally, relaxed fitting is applied to a base mesh given a set of level n vertices. For each level n (starting at n=0) component (a component can be an edge, face, or vertex), a respective component rule (edge rules, face rules, vertex rules) tells us how to compute level n+1 vertices (although the level n+1 vertices do not actually need to be computed yet). The components and component rules are inherent in the Catmull-Clark subdivision rules. We traverse level n components to identify and traverse level n+1 vertices.

Operation 2800 identifies 2800 influencing level N vertices according to Catmull-Clark rules. Influencing vertices are defined as vertices on the mesh, which will influence a particular level n+1 vertex. Using standard Catmull-Clark rules, only certain vertices are used to calculate a particular level n+1 vertex. See E. Catmull, J. Clark, "Recursively Generated B-Spline Surfaces on Arbitrary Topological Meshes," in Computer Aided Design 10, 6 1978, (or any other publication describing the Catmull-Clark subdivision rules) on how to determine which vertices are affected. More on this will be discussed below.

The method then determines 2802 and applies a flattening transformation to the influencing vertices and the faces on which they lie in a way that reflects the surface distances between said vertices. See "Constrained Texture Mapping for Polygonal Surfaces," Computer Graphics SIGGRAPH Conf. Proc. (2002), ACM.

The method then calculates 2804 weighted averages of the flattened vertices using standard Catmull-Clark subdivision rules to determine the flattened level n+1 vertex. This is done so that a new relaxed vertex can be calculated which can have improved results when fitting is applied.

The method then remaps 2806 the flattened level n+1 vertex to the surface of the mesh, using the inverse of the flattening transformation. This is done so is it determined where on the base mesh this vertex should be placed. More on this operation will be described below.

Figure 29:
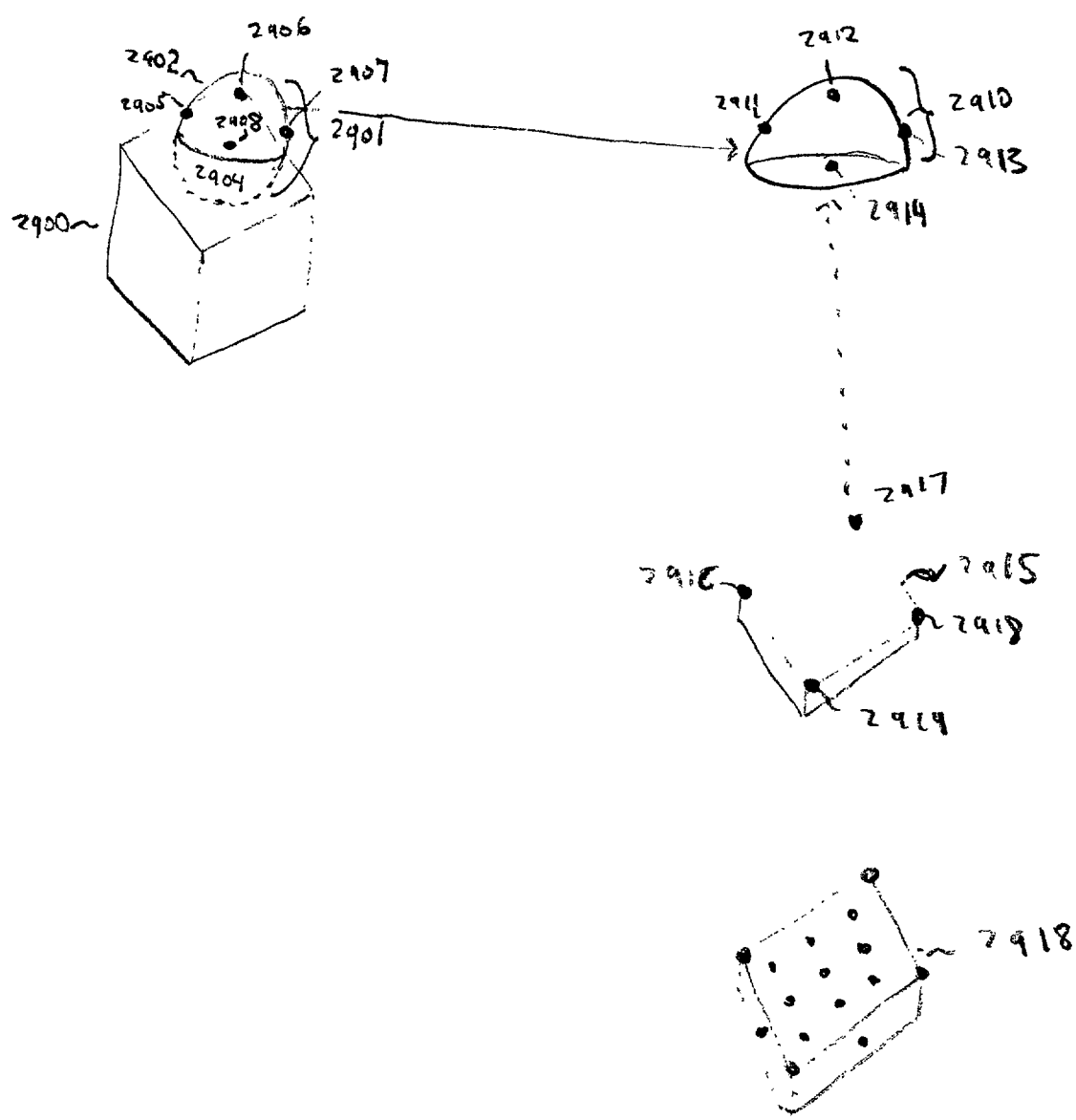
FIG. 29 illustrates a subtraction of a cube from a sphere, and the corresponding Boolean base mesh, according to an embodiment of the present invention.

FIG. 29 illustrates a subtraction of a cube from a sphere, and the corresponding Boolean base mesh.

Limit surface cube 2900 and limit surface sphere 2901 are intersected. Limit surface sphere 2901 comprises visible portion 2902 and hidden portion 2904. Visible portion 2902 is the result of the subtraction operation.

Boolean base mesh 2915 is the Catmull-Clark base mesh computed for the subtraction operation according to the methods described above. Note the bottom edge of Boolean base mesh 2915 is creased. Boolean base mesh 2915 subdivides into Boolean surface 2910. Note that Boolean surface 2910 approximates visible portion 2902, but is not an exact fit. Thus fitting can be applied (as described above) on the Boolean base mesh 2915 to improve the fit of Boolean surface 2910 and visible portion 2902.

Vertices 2916, 2917, 2918, and 2919 on Boolean base mesh 2915 correspond to vertices 2911, 2912, 2913, and 2914 on Boolean surface 2910, and vertices 2905, 2906,

2907, and 2908 on visible portion 2902. As described above, the refitting operation can move vertices 2916, 2917, 2918, and 2919 on the Boolean base mesh 2915 to better fit the corresponding vertices on the Boolean surface 2910 to the visible portion 2902.

If the refitting still isn't as accurate as desired, as described above, the Boolean base mesh can be subdivided into subdivided Boolean base mesh 2918. This provides more vertices to refit, improving accuracy of the refitting. However, these newly created vertices are not ideal for fitting. Another method of creating these new vertices is described herein as relaxed fitting.

FIG. 30 illustrates flattening of three-dimensional vertices. Flattening is used as a tool to improve the selection of new vertices for fitting.

Three dimensional umbrella 3000 is illustrated which contains 6 points. This umbrella can be "flattened" into two dimensions, using the Levy method or any other known method. Flattened umbrella 3002 illustrates the three dimensional umbrella 3000 flattened. Note that the distances between vertices in the three dimensional umbrella 3000 is preserved as closely as possible in the flattened umbrella 3002.

Three dimensional base mesh 3004 is a rectangular base mesh in three dimensions. Flattened base mesh 3005 corresponds to a flattened version of the base mesh 3004. An flattened origin 3007 (0,0) can be selected on the flattened base mesh 3005, which can be used to map coordinates in this two dimensional world. A vertex 3008 is located at coordinates (0.7, 0.3).

The vertex 3008 can be mapped onto the three dimensional base mesh 3004. Three dimensional origin 3010 is a vertex on the three dimensional base mesh 3004 which corresponds to the vertex at the flattened origin 3007 on the flattened base mesh 3005. From Three dimensional origin 3010, the two dimensional coordinates (0.7, 0.3) can be located on the top face of the three dimensional base mesh 3004. In this example, we map to the top face of the three dimensional base mesh 3004 because the vertex 3008 originally was mapped from the top face of the three dimensional base mesh 3004 (this will be discussed below in more detail).

As can be seen by FIG. 30, three dimensional objects can be flattened, points can be located on the flattened version and then mapped onto the three dimensional object.

Figure 31:
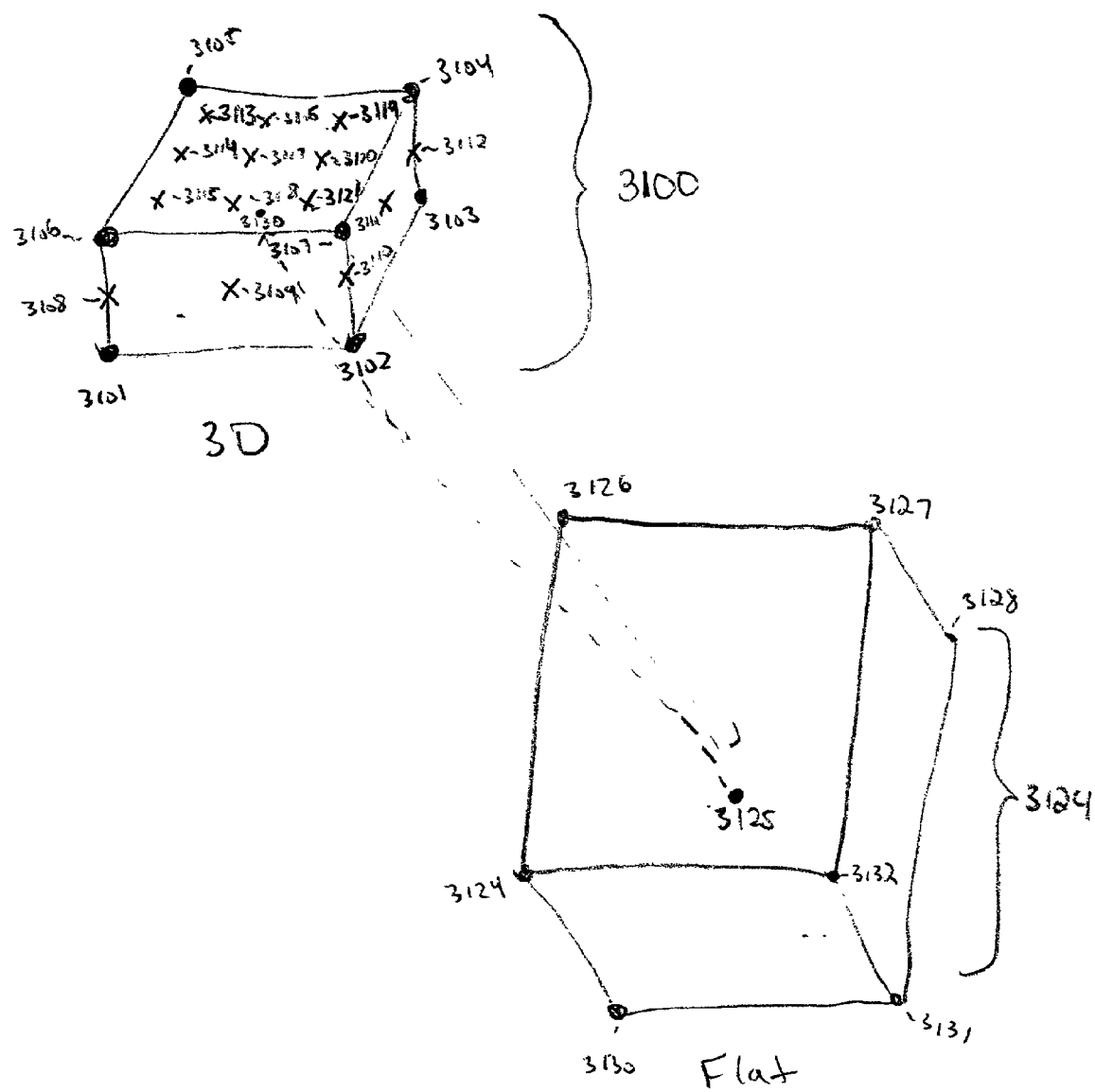
FIG. 31 illustrates one example of the relaxed fitting method, according to an embodiment of the present invention.

FIG. 31 illustrates one example of the relaxed fitting method. Three dimensional base mesh 3100 contains level 0 vertices 3101, 3102, 3103, 3104, 3105, 3106, 3107.

Level n components are traversed according to the Catmull-Clark subdivision rules, to compute the level n+1 relaxed vertices. For each "normal" Level n vertex (a normal vertex is one which is calculated by applying the subdivision rules on the 3-D mesh itself), there is a corresponding Level n relaxed vertex. The "influencing vertices" of a relaxed vertex are also relaxed vertices. The current level n+1 vertex can be identified as being associated with a level n component. New level n+1 vertices comprise edge vertices, vertex vertices, and face vertices.

If the actual "normal" level n+1 vertices were calculated for the base mesh 3100 according to Catmull-Clark subdivision rules, since the cube would subdivide into a sphere, the level n+1 vertices would fall inside the cube. However, at this point all that we need to know is which of the vertices (in this case level n=0) influence a current level n+1 vertex. Certain level n vertices affect level n+1 vertices. If a level n vertex is part of the calculation of a level n+1 vertex, then it is an influencing vertex. The influencing vertices, components, and calculations are all inherent in the Catmull-Clark subdivision rules as described in E. Catmull, J. Clark, "Recursively Generated B-Spline Surfaces on Arbitrary Topological Meshes," in Computer Aided Design Oct. 6, 1978, and other related publications.

By way of example we traverse a level n+1 vertex vertex (not pictured), although the exact order of traversal of vertices for level n+1 components does not matter. This vertex vertex corresponds to a "relaxed" vertex vertex (to be computed). First, the influencing vertices which affect the particular vertex vertex are identified. As stated above, this determination is performed according to the standard Catmull-Clark subdivision rules. The influencing vertices for our traversed level n+1 vertex vertex are 3101, 3102, 3103, 3104, 3105, 3106, and 3107.

Then, the identified influencing vertices are flattened. Flattened vertices 3124 represents the influencing vertices flattened into two dimensions and comprise vertices 3126, 3127, 3128, 3129, 3130, 3131, 3132, which correspond to flattened versions of original vertices 3105, 3104, 3103, 3106, 3101, 3102, 3107, respectively. Then the Catmull-Clark (or any other scheme) subdivision rules are applied to the flattened vertices 3126, 3127, 3128, 3129, 3130, 3131, 3132 to compute 2-D vertex 3125. Relaxed 2-D vertex 3125 is mapped in the flattened world using flattened vertex 3129 as an origin (although any other vertex on the face could be used as well.) Then the coordinates of 2-D vertex 3125 are mapped onto three dimensional base mesh 3100 by finding the 2-D coordinates for vertex 3125 and mapping these 2-D coordinates onto the top face of the original mesh. Vertex 3106 (corresponding to vertex 3129) is used as the origin on the top face to map the 2-D coordinates of relaxed vertex 3121 onto the top face of the original base mesh. 3-D relaxed vertex 3121 corresponds to the 2-D vertex 3125 mapped onto the three dimensional base mesh 3100.

Note that the face that the flattened 2-D vertex falls on is identified, and the vertex is then mapped to the corresponding face in the 3-D mesh. In the previous example, 2-D vertex 3125 falls on a top face in the flattened world, so it is mapped as 3-D relaxed vertex 3121 in the corresponding face (the top face) of the 3-D mesh 3100.

When a normal vertex lies on a crease (a normal vertex being the vertex calculated from the 3-D mesh without flattening), the corresponding relaxed vertex should be constrained to lie on the crease as well, even though it may end up on a different point along the crease than the corresponding normal vertex.

The process above can be repeated for all of the level n+1 vertices traversed on the original mesh, which produces corresponding relaxed vertices. These relaxed vertices can then be used for the refitting operation, as discussed above. New relaxed vertices 3108, 3110, 3112, 3114, 3116, 3118, 3120, 3109, 3111, 3117, 3113, 3115, 3119, and 3121 are created in this manner. The new vertices can be classified as follows: edge vertices 3108, 3110, 3112, 3114, 3116, 3118, 3120; face vertices 3109, 3111, 3117; vertex vertices 3113, 3115, 3119, 3121. All of these vertices were created by traversing new level n+1 vertices on the base mesh 3100 (although the actual vertices for base mesh 3100 need not actually be calculated because they are computed later) and performing the identifying, flattening, and mapping onto the base mesh 3100, as discussed above.

The result is a base mesh 3100 with relaxed vertices 3108, 3109, 3110, 3111, 3112, 3113, 3114, 3115, 3116, 3117, 3118, 3119, 3120, and 3121, that are more ideal for performing the fitting operations described above. These vertices are more ideal because they are calculated using both the topology of the base mesh as well as Catmull-Clark subdivision rules. The reason for relaxation is because it avoids fitting to closely spaced samples. The relaxation properly spaces out the samples.

Note how the hierarchically calculated relaxed vertices are used. Suppose that relaxed vertices have been calculated all the way to level 3. When fitting any Level n vertex, (n has to be less than or equal to 3 in this example) there is a specific Level 3 relaxed vertex that corresponds to it. For example, when fitting a Level 0 vertex V, the specific Level 3 relaxed vertex V' is a vertex-vertex of a Level 2 relaxed vertex which is a vertex-vertex of a Level 1 relaxed vertex which is a vertex-vertex of the initial relaxed vertex identical to the original Level 0 vertex V. Since V' lies on the base mesh, we can calculate its corresponding limit point V". We end up fitting V so that its limit point is V".

Figure 32:
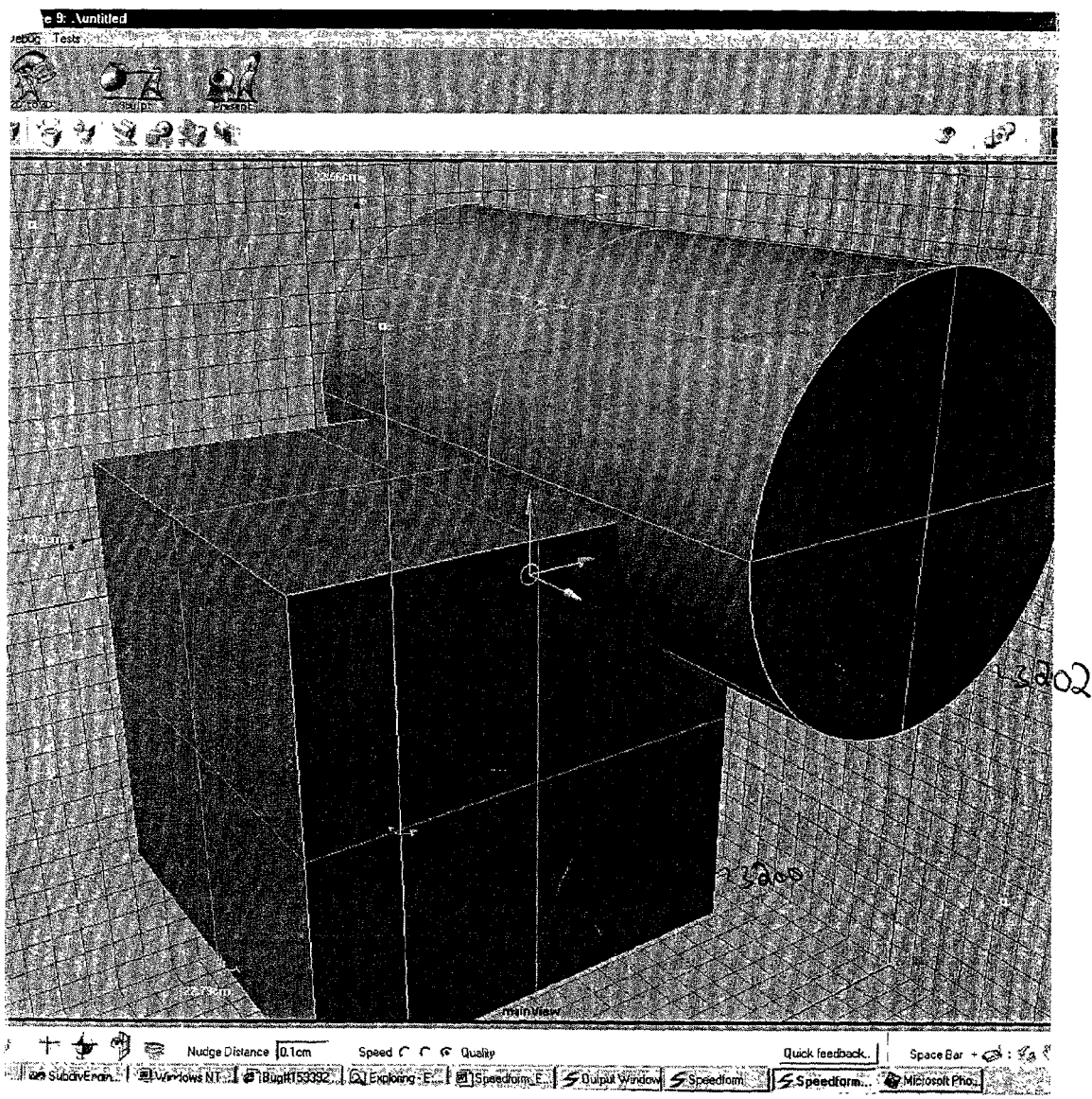
FIG. 32 illustrates inputs of a cube and a cylinder, according to an embodiment of the present invention.

FIG. 32 illustrates inputs of a cube and a cylinder, according to an embodiment of the present invention. Cube 3200 and cylinder 3202 are subdivision surfaces resulting from separate base meshes (not pictured).

Figure 33:
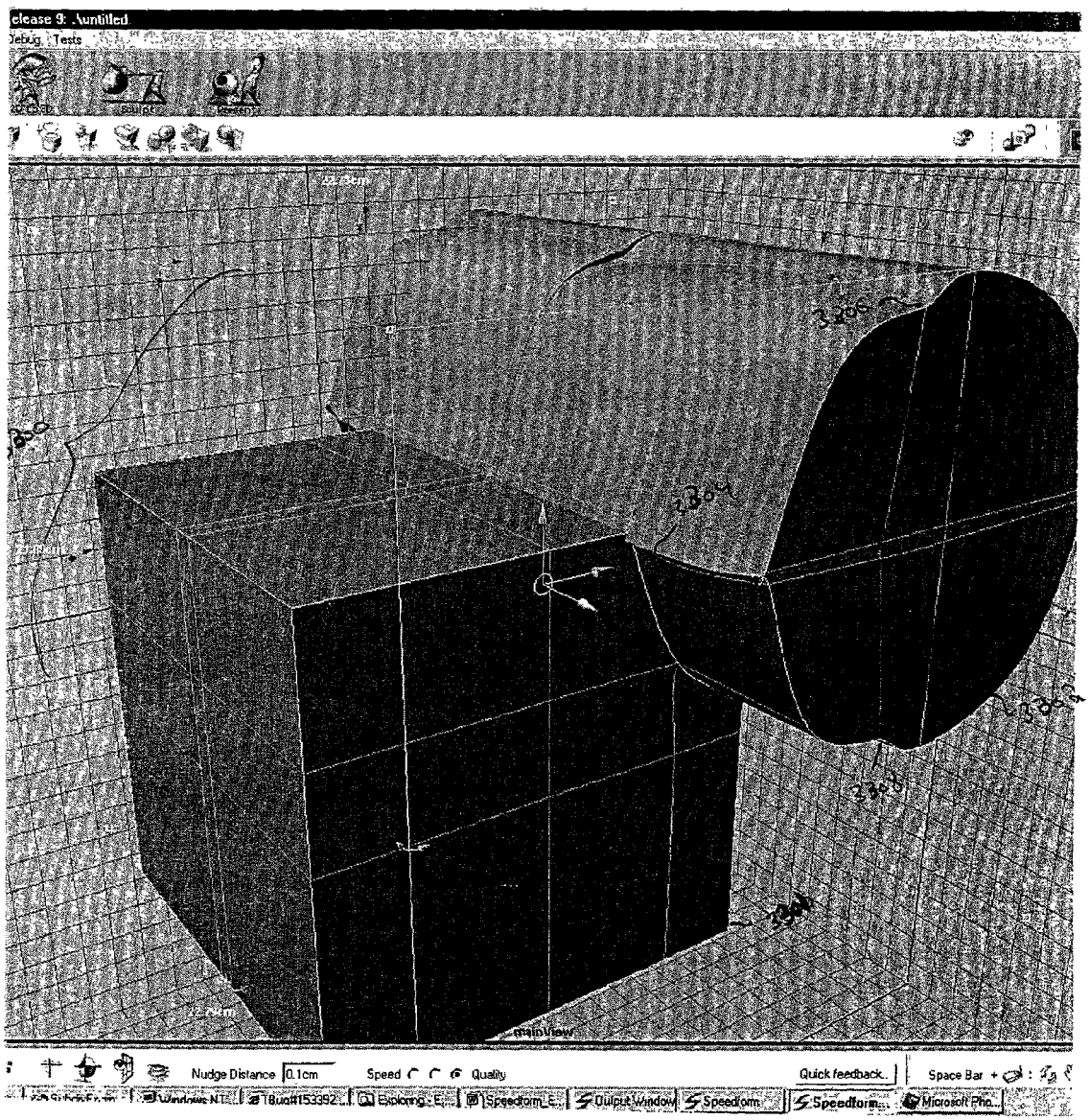
FIG. 33 illustrates a result of performing a union operation on the inputs illustrated in FIG. 30, without the refitting operation, according to an embodiment of the present invention.

FIG. 33 illustrates a result of performing a union operation on the inputs illustrated in FIG. 32, without the refitting operation, according to an embodiment of the present invention. The result of a Boolean union performed on the inputs of FIG. 32 is union result 3300. Note that there exists a cube portion 3301 of union result 3300 and a cylinder portion 3302. Note that the result of performing the union operation as described herein is one base mesh, which subdivides to create the union result 3300. Note that the union result 3300 contains distorted areas 3304, 3306, 3308.

Figure 34:
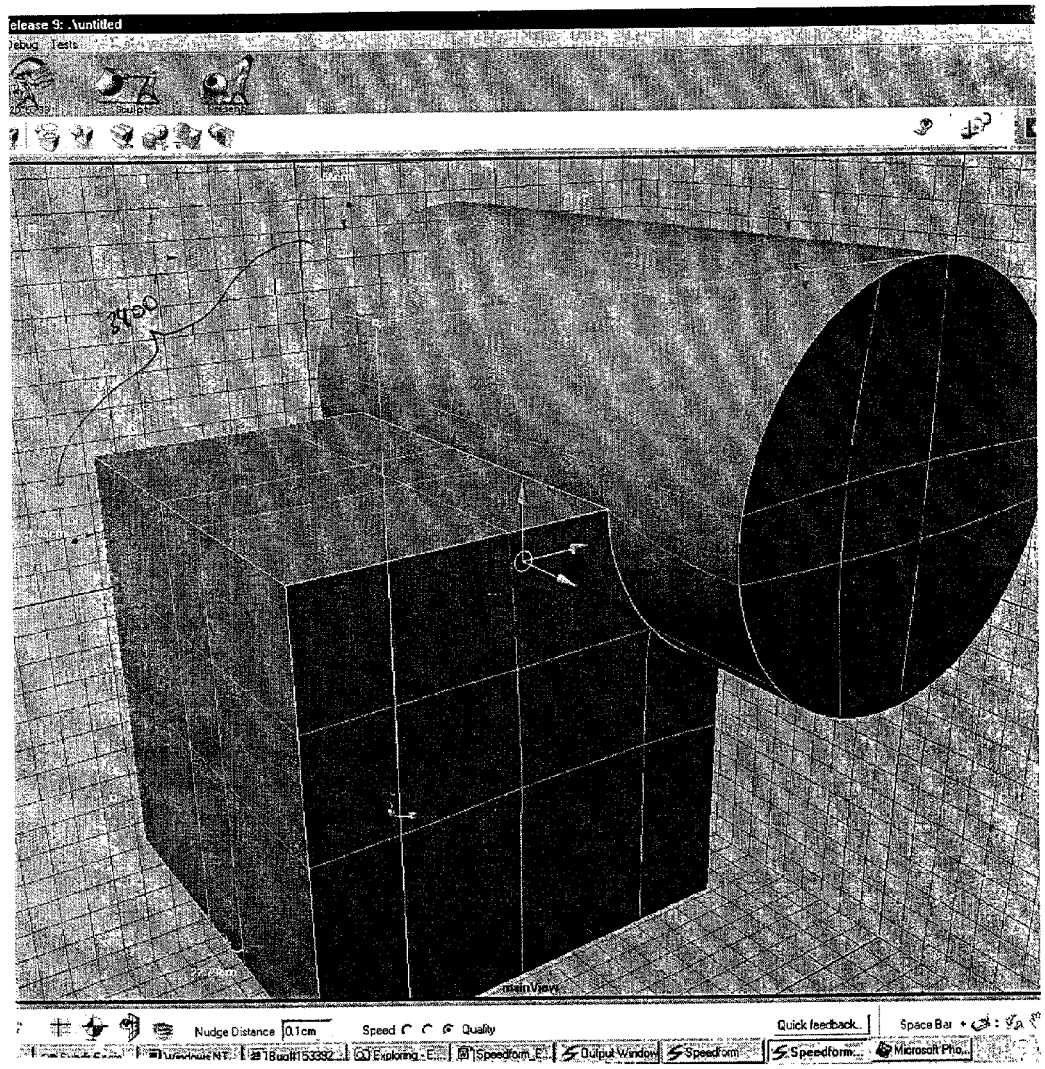
FIG. 34 illustrates the refitting operation applied to the base mesh used to create the surfaces illustrated in FIG. 33, according to an embodiment of the present invention.

FIG. 34 illustrates the refitting operation applied to the base mesh used to create the surfaces illustrated in FIG. 33, according to an embodiment of the present invention. The refitting operation as described herein is applied to the base mesh (not pictured) which (after refitting) subdivides to create the refitted union result 3400. FIG. 33 illustrates the refitting using the relaxed technique described above.

Figure 35:
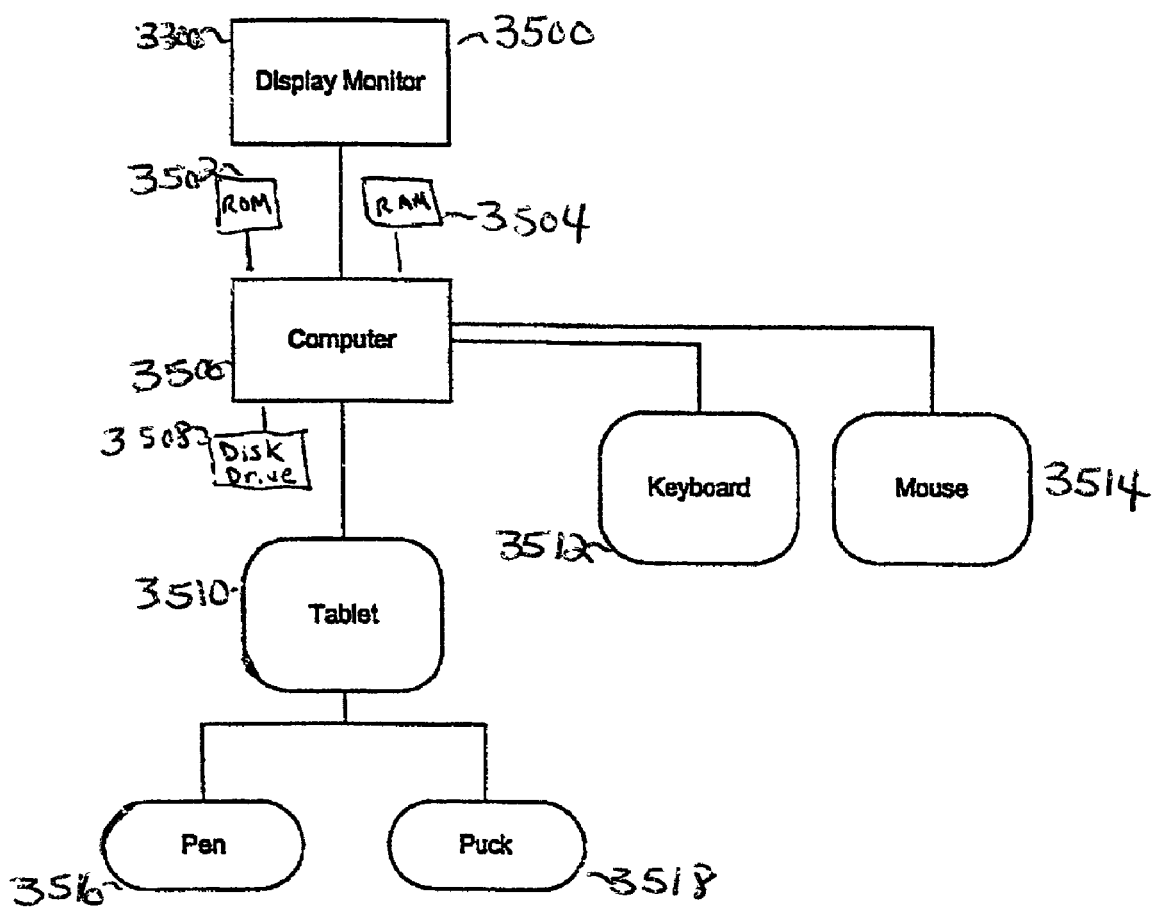
FIG. 35 illustrates one possible configuration of hardware used to implement the present invention, according to an embodiment of the present invention.

FIG. 35 illustrates one possible configuration of hardware used to implement the present invention, according to an embodiment of the present invention.

Computer 3506 contains a ROM 3502, a RAM 3504, and a disk drive 3508. Computer 3506 is also connected to a display monitor 3500. Computer 3506 is connected to a keyboard 3512 and a mouse 3514. Computer 3506 can also be connected to such input devices as a tablet 3510, which may include a pen 3516 and a puck 3518.

The present invention performs a Boolean operation on two subdivision surfaces by generating subdivision surfaces; computing intersection curves where surfaces intersect and generating faces from these curves; chopping up faces into pieces; and selecting desired pieces and refitting the selected pieces. Note that the present invention can apply to subdivision surfaces in any number of dimensions greater than one.

The methods described herein can be stored on a computer readable storage medium such as a floppy disk, hard disk, CD-ROM, RAM, etc., which can be read by a computer in order to execute the methods on the computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
chopping pieces of two Catmull-Clark bases meshes which correspond to pieces of a Boolean surface computed from limit surfaces of the two base meshes;
creating new edges on the chopped pieces to create quadrilaterals and triangles: merging the chopped pieces with the new edges into a Boolean base mesh which approximates the Boolean surface;
refitting vertices on the Boolean base mesh which subdivides into a limit surface which better fits the Boolean surface; and
calculating an additional vertex to refit by flattening influencing vertices of a chosen vertex and mapping a relaxed vertex to the Boolean base mesh, the relaxed vertex calculated by applying subdivision rules to the flattened influencing vertices.

2. A method as recited in claim 1, further comprising refitting the Boolean base mesh using the relaxed vertex.

3. A method, comprising: identifying selected faces calculated from intersection curves formed by intersecting two Catmull-Clark subdivision surfaces created from two base meshes, the selecting based on a selected Boolean operation;
chopping the two base meshes directly to create base mesh pieces which form the selected faces;
creating edges on the base mesh pieces to create quadrangular faces;
merging the base meshes into a single Boolean base mesh, refitting the Boolean base mesh to better fit the Boolean base mesh's limit surface with the selected faces; and
wherein the refitting calculates a relaxed vertex by flattening part of the Boolean base mesh and applying subdivision rules to the flattened part.

4. A method as recited in claim 3, wherein the relaxed vertex is mapped from the flattened part to the Boolean base mesh.

5. A method, comprising:
identifying selected faces calculated from intersection curves formed by intersecting two Catmull-Clark subdivision surfaces created from two base meshes, the selecting based on a selected Boolean operation;
chopping the two base meshes directly to create base mesh pieces which form the selected faces;
creating edges on the base mesh pieces to create guadrangular faces; and
merging the base meshes into a single Boolean base mesh, and
wherein the identifying computes faces at intersections of the two subdivision surfaces, and
wherein the chopping chops the base mesh pieces at endpoints which have limit points at the intersections.

6. A method comprising:
traversing a higher level vertex on a Boolean base mesh;
identifying and flattening influencing vertices influencing the traversed vertex; and
mapping a new vertex, computed by applying subdivision weights to the flattened influencing vertices, to the Boolean base mesh.

7. A method as recited in claim 6, further comprising: refitting the Boolean base mesh using the new vertex.

8. A method as recited in claim 6, further comprising repeating the traversing, identifying, and mapping for a plurality higher level vertices for the Boolean base mesh identified according to subdivision rules.

9. A method as recited in claim 8, further comprising refitting the Boolean base mesh using a plurality of mapped new vertices.

10. A method, comprising:
chopping pieces of two Catmull-Clark bases meshes which correspond to pieces of a Boolean surface computed from limit surfaces of the two base meshes;
creating new edges on the chopped pieces to create quadrilaterals and triangles; and
merging the chopped pieces with the new edges into a Boolean base mesh which approximates the Boolean surface;
traversing a higher level vertex on a Boolean base mesh;
identifying and flattening influencing vertices influencing the traversed vertex;
mapping a new vertex, computed by applying subdivision weights to the flattened influencing vertices, to the Boolean base mesh;
repeating the traversing, identifying, and mapping for a plurality higher level vertices for the Boolean base mesh identified according to subdivision rules;
refitting the Boolean base mesh using a plurality of mapped new vertices,
wherein a Boolean operation used to create the Boolean surface is one of scoring, intersection, difference, union,
wherein the chopping the pieces is performed directly onto the original base meshes,
wherein the faces are calculated by generating cubic Bezier surfaces,
wherein the merging merges pieces of the base mesh at intersection points of the limit surfaces,
wherein the base meshes comprise quadrilaterals,
wherein during the creating, quadrilaterals are preferred over triangles,
wherein the quadrilaterals created are convex quadrilaterals.

* * * * *

UNITED STATES PATENT AND TRADEMARK OFFICE
CERTIFICATE OF CORRECTION

PATENT NO. : 6,989,830 B2
APPLICATION NO. : 10/185748
DATED : January 24, 2006
INVENTOR(S) : Eric Joel Stollnitz et al.

It is certified that error appears in the above-identified patent and that said Letters Patent is hereby corrected as shown below:

Cover Page, Inventors, please correct the spelling of the second inventor from "Leipa" to --Liepa--.

Cover Page, Col. 2, Other Publications, after "Stam", delete "." and insert --,--

Drawing Sheet, Fig. 25, Box 2508, change "additonal" to --additional--; and above "rectangle" change "verticis" to --vertices--.

Col. 1, line 41, after "6", insert --,--.

Col. 2, line 35, after "surfaces", change ";" to --,--.

Col. 3, line 35, after "invention", change "." to --;--.

Col. 6, line 15, delete "spaces" between "MAYA" and "R".

Col. 6, line 20, insert --.-- after "score".

Col. 8, line 17, change "From" to --from--.

Col. 16, line 9, change ":" to --;--.

Col. 16, line 46, change "guadrangular" to --quandrangular--.

Col. 16, line 54, after "method" insert --,--.

Signed and Sealed this

First Day of August, 2006

JON W. DUDAS
*Director of the United States Patent and Trademark Office*